United States Patent [19]

Smith et al.

[11] Patent Number: 5,455,409
[45] Date of Patent: Oct. 3, 1995

[54] APPARATUS AND METHOD FOR MONITORING A PLURALITY OF CODED ARTICLES AND FOR IDENTIFYING THE LOCATION OF SELECTED ARTICLES

[75] Inventors: George C. Smith; Brady L. Cleaver; Robert Bower, Jr., all of Bryan, Tex.

[73] Assignee: Texas Digital Systems, Inc., College Station, Tex.

[21] Appl. No.: 107,258

[22] Filed: Aug. 16, 1993

[51] Int. Cl.⁶ .................................................. G06F 15/24
[52] U.S. Cl. .......................... 235/385; 235/441; 364/401; 364/403
[58] Field of Search ...................... 235/375, 381, 235/385, 383, 382; 369/33; 364/401, 403; 360/137; 340/825.49

[56] References Cited

U.S. PATENT DOCUMENTS

| | | | |
|---|---|---|---|
| 3,757,037 | 9/1973 | Bialek | 178/6.6 |
| 4,300,040 | 11/1981 | Gould et al. | 235/381 |
| 4,338,644 | 7/1982 | Staar | 360/137 X |
| 4,458,802 | 7/1984 | Maciver et al. | 194/4 |
| 4,636,634 | 1/1987 | Harper et al. | 250/223 |
| 4,704,517 | 11/1987 | Campisi et al. | 235/382 |
| 4,839,875 | 6/1989 | Kuriyama et al. | 369/14 |
| 4,907,163 | 3/1990 | Cook | 364/474.15 |
| 4,907,889 | 3/1990 | Simone | 360/92 |
| 4,920,432 | 4/1990 | Eggers et al. | 360/33.1 |
| 5,028,766 | 7/1991 | Shah | 235/381 |
| 5,050,031 | 9/1991 | Weiley | 360/137 |
| 5,133,441 | 7/1992 | Brown | 194/211 |
| 5,287,414 | 2/1994 | Foster | 235/385 X |
| 5,301,106 | 4/1994 | Hersum | 364/401 |

FOREIGN PATENT DOCUMENTS

| | | |
|---|---|---|
| 56-110193 | 9/1981 | Japan . |
| 2185497 | 7/1990 | Japan . |

*Primary Examiner*—Donald Hajec
*Assistant Examiner*—Michael G. Lee
*Attorney, Agent, or Firm*—Akin, Gump, Strauss, Hauer & Feld

[57] ABSTRACT

An apparatus for storing and monitoring a plurality of articles, including at least one cabinet or carrier having a plurality of receptacles in which the articles are stored. In one application, the apparatus is utilized to maintain a library of magnetic tapes or other storage media associated with a data processing center. Each of the articles is identified by a respective code or volser number, and requests for the articles are received by the system in the form of requests for a particular volser number. In a preferred embodiment, the articles may be randomly stored in any of the receptacles in any of a plurality of carriers. The system includes a polling and searching system operable to identify the carrier in which a requested article is currently stored, and a display system operable to display the carrier's location. A host computer controls the operation of the system, but no central data base is maintained of the coded articles. Instead, their volser numbers and usage histories are stored in respective memories associated with each coded article.

48 Claims, 13 Drawing Sheets

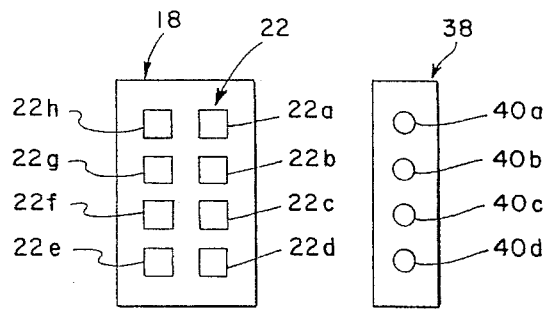
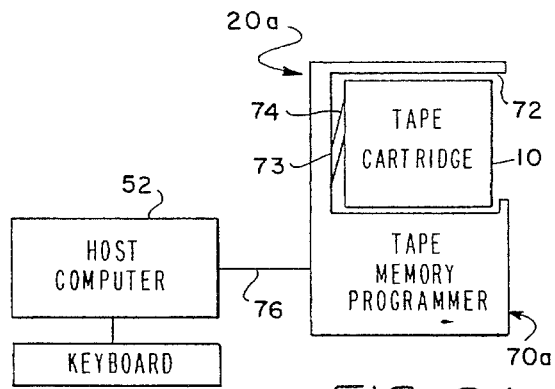
FIG. 5A  FIG. 5B
FIG. 8A
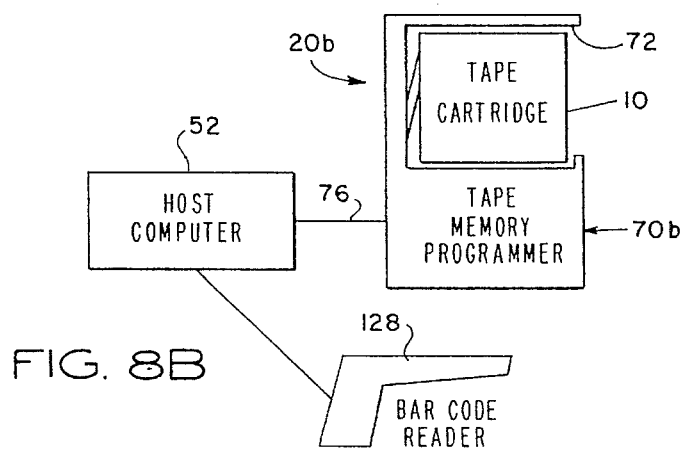
FIG. 8B
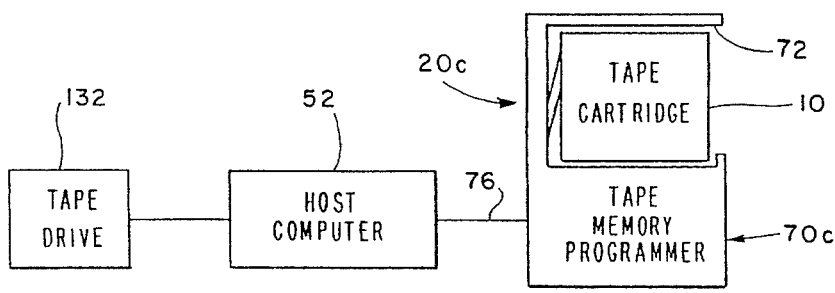
FIG. 8C
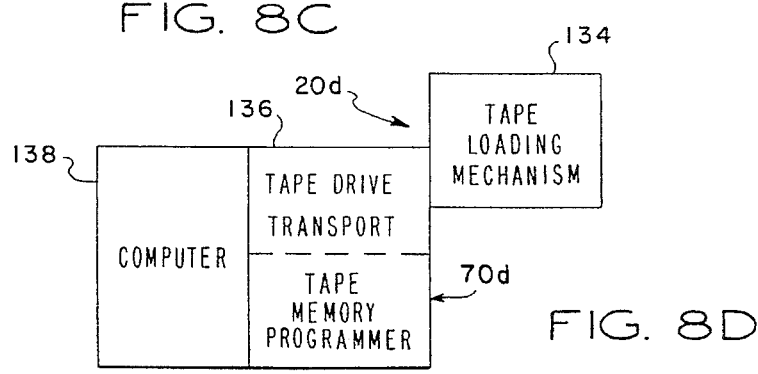
FIG. 8D

APPARATUS AND METHOD FOR MONITORING A PLURALITY OF CODED ARTICLES AND FOR IDENTIFYING THE LOCATION OF SELECTED ARTICLES

FIELD OF THE INVENTION

This invention relates to apparatus and methods for monitoring a plurality of coded articles and, more particularly, to apparatus having a plurality of carriers for receiving coded articles and a system and methods for determining the current location of a selected article.

BACKGROUND OF THE INVENTION

The organization and management of collections of articles such as books, tapes, cassettes, and the like has been difficult when a large number of such articles is required to be maintained in such a manner that selected articles may be quickly located and retrieved. Requests for particular articles stored in large libraries are typically met by searching through an index, data base, or the like, determining the location within the library of a requested article from the data base or index, locating the particular cabinet or case, and shelf, in which the requested article is stored, and retrieving the article from the particular case or cabinet. In libraries containing large numbers of articles, multiple searches for requested articles during a work day can be tedious and time consuming. One form of library in which prompt location and retrieval of stored articles is of particular importance is that of libraries of magnetic tapes, associated with data processing centers. Such magnetic tapes may be in the form of open reel tapes or tape cartridges of various types. Large data processing centers sometime require libraries of thousands or even hundreds of thousands of magnetic tapes for use with a mainframe computer, and it may be necessary, in a typical work shift, to retrieve many requested tapes from the library and to load the tapes into appropriate tape drives interconnected with the computer. The tapes are normally coded with unique alphanumeric identification numbers, and a tape request will typically be in the form of a request for a tape having a specified identification number, to be loaded in a designated tape drive.

Because of the substantial capital investment and ongoing operating expenses associated with large data processing installations, it is of substantial importance that such tape requests be quickly and accurately met. Thus, it may be specified that responses to tape requests be completed in less than one minute, on average.

BACKGROUND OF THE PRIOR ART

In most data centers, the tapes are filed in fixed, alphanumeric or numeric order. Such data centers have typically utilized a plurality of tape carriers or cabinets, each having a plurality of slots for receiving respective tapes. As suggested above, in modern data processing centers, thousands or even hundreds of thousands of tapes are stored in thousands of tape carriers arranged in multiple rows throughout the library. Typically, the code assigned to a respective tape constitutes a unique volume serial number, commonly termed the tape "volser." The volume serial number may be magnetically stored in a section of the tape, as well as being visibly indicated on a label attached to the tape or tape cartridge.

When it is necessary for a mainframe computer to read from or write to a tape, a tape mount request is issued which contains the volser of the tape needed and the number of the tape drive in which the tape should be mounted. In a conventional tape library, the operator is then required to: (a) determine the approximate location within the library of the requested tape; (b) physically locate the case or carrier in which the requested tape is stored; (c) identify the position of the tape in the carrier or case; (d) withdraw the tape; and (f) insert it into the appropriate tape drive. Thus, in large tape libraries having hundreds of thousands of tapes, the time required to physically locate and retrieve a tape can be significant.

In some data centers, the use of automated, robotic retrieval systems has been proposed for locating and mounting the tapes. However, because of the thousands of tapes which are stored in a typical data center library, it would be difficult to provide an automated, robotic system which could locate and retrieve tapes from any of the thousands of tape carriers throughout the entire library. Substantial distances are entailed between sections of such libraries, and a fully automated system would be very complex and expensive. Accordingly, such robotic retrieval systems, when used, have generally been implemented in only a limited portion of a tape library. It is typically sought to use the robots in a localized section of the library having those tapes which are to be used most frequently. However, the usage pattern may vary over time, and it is thus necessary on occasion to switch the tapes from the local, automated section to the main section of the library, and vice versa. Another disadvantage of such robotic systems is that it is necessary to maintain an empty slot or tape receptacle in the main, non-automated portion of the library in addition to a slot or receptacle in the robotically accessed portion, so that tapes may be returned to an assigned slot in the main library when they are no longer needed in the robotically accessed portion. This, of course, increases the cost of the system and entails redundant, wasted space.

As previously noted, in most data centers the tapes are filed numerically or alphabetically, each tape being assigned to a respective slot. In such a system, the integrity of the library depends upon the tapes being stored in correct, alphanumeric order, yet it is possible that a tape may be misfiled and lost during one of the many handling procedures. In a library with several hundred thousand tapes, this can become a serious problem, because it is very time consuming to visually check the volser numbers of each tape. Additionally, apart from the likelihood of instances of misfilings or the like, maintaining the tapes in a fixed, alphanumeric order is disadvantageous because the tapes which are used most often are distributed throughout the library, and the time required to locate and retrieve a requested tape may be substantial unless the tape happens to be located in a carrier close to the operator and to the tape drive in which it is to be mounted. Large libraries entail substantial distances between the respective tape carriers and tape drives, and, as the distances increase, the average time required to obtain and mount the tapes increases, which is costly in terms of lost operating time for the mainframe computer.

In other systems, such as that disclosed in U.S. Pat. No. 4,839,875 to Kuriyama, it has been sought to improve the maintenance of a library of videocassettes by storing certain commodity information in memories within IC circuits mounted within each videocassette tape cartridge, whereby a tape can be sensed and identified, upon its being inserted within a designated slot within the rack in which the tape is to be stored. Commodity information stored in a RAM memory contained in each video cassette is read into a central processing system as each cartridge is inserted into a slot within a tape carrier, by means of optical transceivers. A videocassette inserted within a slot may be identified by the transmission of the respective tape's commodity number to a computer as the tape is inserted, or alternatively, as it is removed. A central data base of the library, stored within the computer, is thereby updated. Such systems have been of limited capacity, and an extensive system of cables must be connected between the host computer and the photodetector and light emitting elements within each respective slot. Moreover, the use of infrared transducers at each slot is expensive, and they are subject to malfunctions. In large data processing centers, the connection of individual electrical cables between a host computer and each of the thousands or hundreds of thousands of slots, located in thousands of shelf units or carriers throughout the library, would be difficult and very expensive. Additionally, such systems do not afford the high degree of reliability necessary for control of a large library, such as those entailed in large data processing centers. In such systems, the centralized data base of the status and usage of all of the rental articles may be maintained in a host computer or processing center, and such information is subject to being compromised or lost by malfunctions due to disk drive failures, power outages, operator error, or the like. Additionally, in a system such as that of the Kuriyama patent, individual batteries are required to continuously power the respective circuit chips of each videocassette in order to maintain the commodity information stored in the respective RAM memories, and the information may be lost if the batteries are not replaced on a timely basis. It will be appreciated that in a large library containing thousands of articles, the monitoring and periodic replacement of batteries within each respective rental article would entail a substantial amount of time and expense. Moreover, the accuracy and reliability of such a system depends upon the consistent operation of the IC circuits and RAM memories, which depend upon constant power derived from the batteries within each of the rental articles. Such a system would not be acceptable in a large library in which positive location of each stored article is of critical importance.

As discussed above, it is of major importance in data processing centers that the location of a requested tape can be quickly and positively obtained, so that retrieval of the tape, and loading of the tape in a specified tape drive, may be accomplished as quickly as possible to minimize delays or down time of the mainframe computer pending insertion of the requested tape. In this regard, prior-art systems have not provided a reliable means for indicating the location of requested articles within a large library having multiple carrier units. As suggested above, it would be extremely expensive and difficult to provide such a "location monitoring" function by installing direct cable connections between a central processor, as in the Kuriyama system, and each of the thousands or hundreds of thousands of receptacles or carriers necessitated in large data processing centers.

Because of the importance of minimizing delays in the operation of the mainframe computer, it would be preferable to permit random storage of the tapes, within any of the slots, so that tapes which are to be frequently used during certain periods or for certain programs can be stored within slots which are relatively close to the operator and the appropriate tape drive. For such a randomly filed system, it has been proposed that a data base of the library, containing an index of the tape identification codes and the locations of the respective tapes, may be maintained in a hard drive storage device or other read/write storage media. When it is desired to locate a selected tape in such a system, the data base would be searched for the designated tape code and, upon locating the designated code, the data base entry regarding the tape and its location would be read out, providing the location of the shelf or carrier in which the tape is stored. However, the accurate maintenance and updating of information within a central data base or index, e.g., a data base which associates the volser number of each tape with its current location within the library, entails substantial difficulties and problems. Information regarding the current locations of the tapes would be maintained by entering the location of each tape into the data base and updating the data base when the tapes are removed or moved, whereby the current location and status of the tapes may be determined from the database, as discussed above. In some systems, information regarding the movement and current locations of the tapes has been entered into a database by keying the information into a computer. It has also been proposed to expedite the entry and updating of the "histories" of the tapes by utilizing bar codes and bar code readers, by which an operator may enter the tapes' new location. In either case, the procedure depends upon consistent actions on the part of the operator. Previously proposed systems are thus subject to human error and depend upon accurate and reliable entries of the transactional and position information each time a tape is removed from or inserted into one of the slots.

As will be understood by those in the art, instances of lost or misplaced articles in large libraries such as those utilized in data processing centers may result in significant economic losses if they cause substantial downtime for the mainframe computer, and the location of such articles within libraries having hundreds of thousands of articles is of exceedingly greater difficulty than is the case within small rental libraries, in which missing articles may be located with relatively little effort by an operator, by visually searching through the library for missing or misfiled articles. Thus in large data processing centers, instances of misfiled or missing tapes can be of critical economic significance. From the above discussion, it can be understood that, particularly if the system is to permit random filing of the tapes, it must be exceedingly reliable and must provide convenient, fail-safe operation, with minimal maintenance requirements. There is thus a need for a reliable system for maintaining a library of coded articles, such as computer tapes, books, or the like, wherein the coded articles can be randomly positioned within any of a plurality of receptacles within the library and wherein the location within the library of selected articles may be quickly and reliably determined.

OBJECTS OF THE INVENTION

It is, accordingly, a major object of the present invention to provide a new and improved apparatus and method for monitoring a library of coded articles and for facilitating the location of selected articles within the library.

Another object of the invention is to provide such a system and method in which a plurality of article receptacles are provided, each adapted to receive one of the articles, and in which the articles may be randomly positioned within any of the receptacles, and in which the location of articles randomly positioned in the library may be quickly and reliably determined.

A further object is to provide such a system which is automatically operable to store and update information regarding the identification, location, and usage history of each of the articles without the necessity for entry of such information by an operator utilizing a keyboard peripheral, bar code reader, or the like, wherein operator error is minimized.

A further object is to provide such a system and method in which information regarding the identification of each of the articles is maintained within individual memory devices respectively associated with the articles, whereby the maintaining of a central data base of such information is not required.

A still further object is to provide such an apparatus and method in which, because no central data base and computer memory system is employed for monitoring the current location of each article, enhanced reliability is achieved, and the danger of a catastrophic system failure resulting from loss or compromise of the central data base is eliminated.

Yet another object is to provide such a system and method in which the usage history and an identity code of each article is stored and periodically updated within a circuit device associated with each article.

A still further object of the invention is to provide such a system and method in which each of the circuit devices associated with the respective coded articles is conveniently affixed to an external surface of each coded article, such as a side surface of a tape cartridge or the like, without requiring any cutting or reconstruction of the article, thereby permitting convenient and inexpensive attachment of the circuit devices to the respective articles.

A still further object is to provide such a system and method in which communication between multiple groups or strings of article carriers and a control center and display apparatus is accomplished by means of circuitry providing interfaces between the respective units and the central control system without the necessity for costly and complex electrical wiring extending between the article slots and the central control unit.

Another related object is to provide such a system and method in which direct electrical connection between respective strings or groupings of carriers and a central control unit is not required, thereby minimizing the cost of installation of the system and any maintenance and troubleshooting which may subsequently be required.

Another, related object is to provide such a system which is of practicable, inexpensive design, utilizing commercially available electrical components, and which may therefore be conveniently and economically installed in large data centers, public libraries, and the like.

Further objects and advantages of the invention will become apparent from the specification and accompanying claims and from the accompanying drawing.

SUMMARY OF THE INVENTION

In accordance with one preferred embodiment of the invention, a coded article monitoring and storage system is provided in which coded articles, such as magnetic tape cartridges, are randomly filed in individual slots in a plurality of tape carriers in a data processing system library, or the like. The system is operable for identifying the location of selected ones of the randomly filed tape cartridges in response to tape mount requests received from a mainframe computer, each request including an identification code or "volser" number identifying the requested tape and the tape drive, associated with the computer, in which the tape is to be inserted. Each coded article, e.g., each tape cartridge, is provided with a circuit device and memory operable to store the volser number of the cartridge. In one embodiment, the tape cartridges include circuitry fixed thereon having serially accessible, electrically erasable, read only memory devices (serial EEPROM devices) attached to each tape and storing the volser and usage history of the respective tape. Means are provided for interrogating the memory devices of the tapes and for updating the usage history data in the respective memory devices.

A host computer unit, such as a personal computer, is provided for controlling the overall operation of the system and providing an interface with the mainframe computer, for receiving requests for selected tapes, e.g., the volser numbers of the selected tapes. Upon trapping such a tape request from the mainframe computer, the host computer interrogates circuitry within each of the tape carriers to determine whether there is a match between a requested volser number and the volser numbers of tapes currently stored in the respective tape carriers. In one preferred embodiment, a network of circuit systems is provided for transmitting tape requests from and to the host computer, such circuitry being operable to poll each of the tape carriers, each of which is operable for sequentially comparing the selected tape volser number with the volser numbers of tapes currently stored in the receptacles of the respective tape carrier and, upon matching a selected volser number with that of one of the tape cartridges, for identifying the location of the tape cartridge and transmitting data identifying the location, e.g., the aisle, rack, and carrier number, to the host computer.

In accordance with another aspect of the invention, the host computer is associated with a visual display device for displaying to an operator the location of a selected tape cartridge and the tape drive unit, associated with the mainframe computer, in which the tape is to be loaded.

In accordance with another aspect of the invention, the tape carriers include visual displays, such as LEDs located adjacent each respective receptacle, and circuitry for illuminating the LED adjacent the receptacle containing a requested tape cartridge, for assisting an operator in locating the respective tape cartridge.

In accordance with another important aspect of the system, the individual tapes are randomly stored in any of the receptacles of any of the tape carriers, and they may be transferred as desired to other receptacles and tape carriers. The system includes data transmission means associated with each carrier receptacle and each tape for updating the memory of each carrier when a tape is transferred or removed. This allows the tapes to be conveniently arranged in random, rather than fixed order, thereby permitting tapes which are being frequently used in particular tape drives to be located adjacent the respective tape drives, thus minimizing the time required for an operator to locate the tapes and transport them from the carrier to the appropriate tape drive. The system employs additional subsystems for detecting malfunctions or errors and for alerting an operator to such malfunctions.

In accordance with another aspect of the invention, means are provided for programming the respective memory devices associated with each tape with the volser number of the particular tape and other pertinent information, the programming means suitably including electrical contacts for contacting respective circuit pads on the respective tape cartridges, the contact pads being electrically connected with portions of the EEPROM memory affixed to the respective tape cartridge, for communicating with and writing in the EEPROM memory.

In accordance with another aspect of the invention, a portable, battery-operated programming device is provided for programming the respective tape carriers, suitably by means of infrared data transceiver units adapted to communicate encoded messages via transceiver units associated with each of the tape carriers.

Whereas the invention has particular utility for, and will be described as associated with, a tape library for maintaining tape cartridges to be used in a large data processing center, it should be understood that the system and its method of operation are also operable in association with other forms of libraries. For example, the system is also applicable for maintaining libraries of books, video cassettes, and other articles, wherein the articles are requested by an identification code such as a title, author, Dewey Decimal Number, or the like.

BRIEF DESCRIPTION OF THE DRAWINGS

For a more complete understanding of the invention, reference should be made to the accompanying drawing, wherein:

FIG. 5A is a representation of the contact pad arrangement utilized in association with the respective non-volatile memories of the tapes;

FIG. 5B is a representation of the probe contact members adapted to seat against the contact pads of FIG. 5A;

FIG. 8A is a representation of the tape receptacle, programming unit, and computer utilized in the tape programming system of FIG. 7;

FIGS. 8B, 8C, and 8D are representations of components of alternative tape memory programming systems;

DETAILED DESCRIPTION OF THE PREFERRED EMBODIMENT

Figure 1:
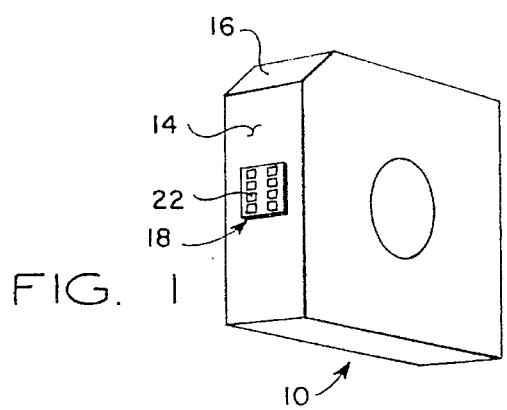
FIG. 1 is a perspective view of one of the tape cartridges and showing the non-volatile memory chip mounted thereon.
Figure 6:
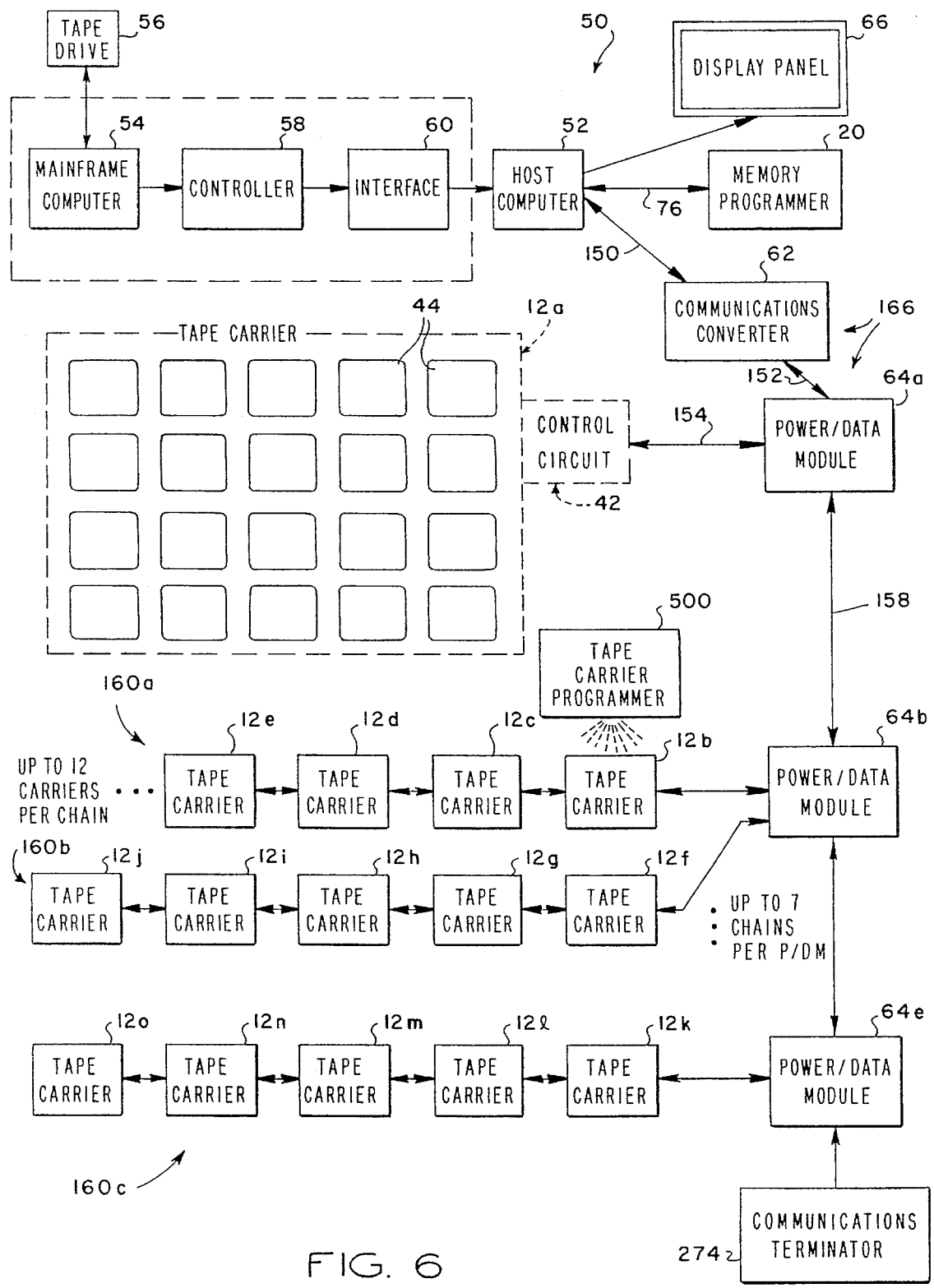
FIG. 6 is a block diagram of the coded article monitoring system.

With initial reference to FIG. 1, one of the tape cartridges 10 which are to be stored in the tape carriers 12 (FIG. 2), is shown. The tape cartridge 10, in the present embodiment, constitutes a tape cartridge of the IBM 3480 type having an open reel, magnetically encoded tape. The tape cartridge 10 comprises a "coded article" in that it is assigned an alphanumeric identification code or "volser" volume serial number, each of the tape cartridges within a data processing center library being assigned a unique volser number. The volser numbers suitably comprise six-digit numbers which are magnetically encoded on the tape headers as well as being printed on labels attached to the tape cartridges. Hereinafter, the coded articles will thus be termed "tape cartridges" or "tapes." As may be seen in FIG. 1, the tape cartridge 10, in the present embodiment, is of approximately rectangular, planar configuration and, for convenience of description, may be said to have a front edge 14 having an upper, diagonally extending corner portion 16 which includes a retractable feed mechanism through which a portion of the magnetic tape is withdrawn, when the tape is mounted within a tape drive, for permitting reading of the tape or writing thereto by the mainframe computer 54, as seen in FIG. 6.

Mounted on the front edge portion 14 of the tape cassette 10 is a non-volatile memory device 18 which, in the preferred embodiment, comprises a serially addressable, electrically erasable, read only memory (serial EEPROM) suitably having a memory capacity of 4096 bytes. A suitable unit is that available from Atmel Corporation as Model No. AT24C04. As will be more fully discussed hereinbelow, each non-volatile memory device 18 is programmed with the volser number of the respective tape cartridge 10 to which the memory 18 is affixed, and the memory includes sufficient capacity for maintaining additional data regarding the history of the tape's usage. Programming of the volser numbers within the non-volatile memories 18 of the respective tapes 10 is accomplished by a tape memory programmer 20 (FIGS. 6, 7 and 8A), to be described hereinafter. The non-volatile memory devices 18 are each provided with contact elements 22, shown in greater detail in FIG. 5A as contacts 22a–22h, which are gold plated for preventing corrosion and enhancing electrical contact. The contact pads are arrayed in two vertical rows, side by side, for reasons which will become apparent from the description hereinbelow.

Figure 2:
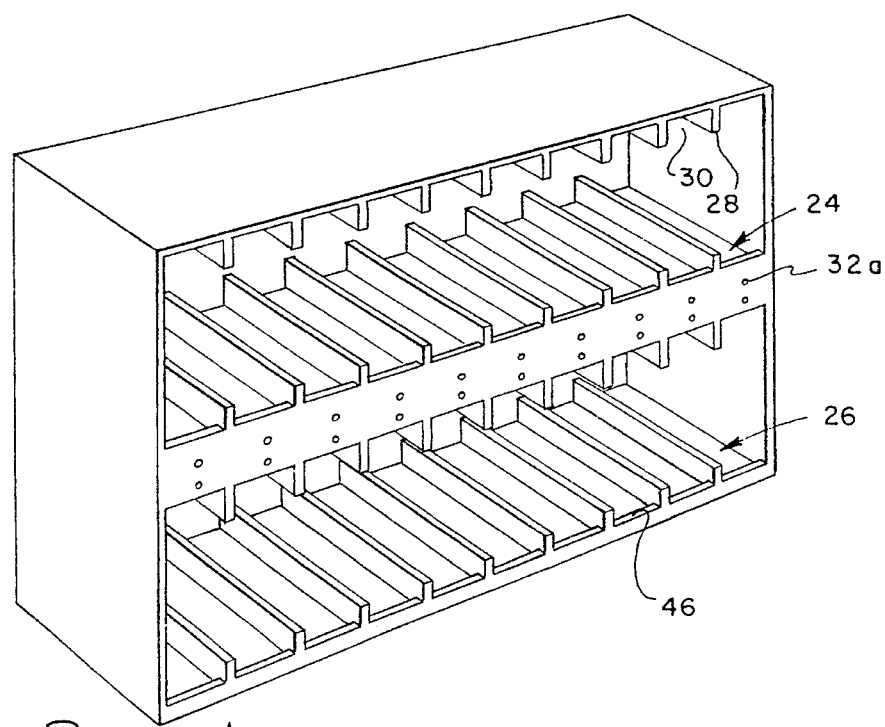
FIG. 2 is a perspective view showing one of the tape carriers in which the tape cartridges are inserted.

Referring primarily to FIG. 2, each of the tape carriers 12 is suitably in the form of an open front case having upper and lower shelves 24, 26, each of which includes a plurality of ridges 28 defining therebetween open slots 30 for receiving the tape cartridges 10. In the present, illustrative embodiment, tape carrier 12 includes twenty slots, each of which is adapted to receive one of the tape cartridges. As noted previously, in large data processing centers having hundreds of thousands of tapes, it will be apparent that thousands of the tape carriers 12 may be required, and the carriers are suitably aligned along a number of aisles, not shown, extending adjacent one or more tape drives 56 (FIG. 6), the carriers typically being stacked one above another and arranged as required for the particular application. As may be seen in FIG. 2, a plurality of LED indicating lamps 32a, 32b are provided, each being located adjacent one of the respective slots 30 for providing an indication regarding the status of any tape cartridge in the slot, or for providing an indication of the location of a requested tape cartridge, or for other purposes, as will also be more fully discussed hereinbelow.

Figure 3A:
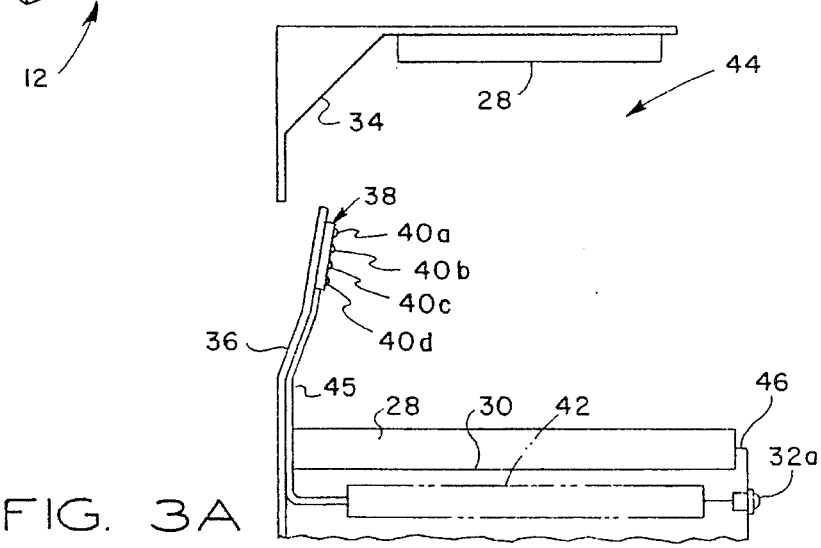
FIG. 3A is a fragmentary sectional representation of one of the tape receptacles showing the resiliently biased contact probe.
Figure 3B:
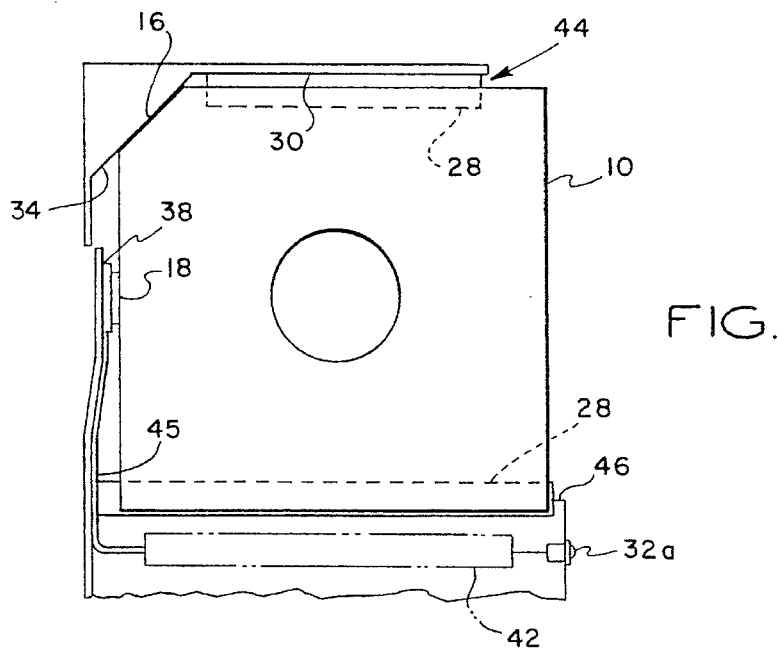
FIG. 3B is a sectional representation, similar to FIG. 3A, showing a tape receptacle having a tape cartridge loaded within the tape receptacle, the circuit device associated with the tape cartridge having its terminal pads in contact with the contact probe of the receptacle.
Figure 4:
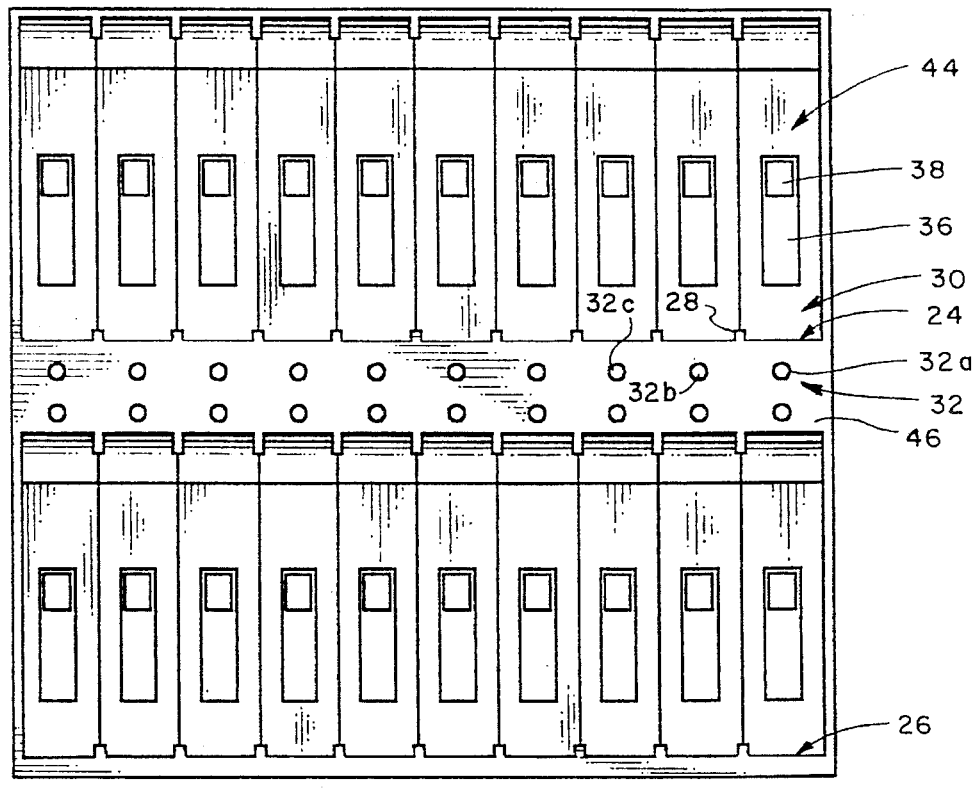
FIG. 4 is a front plan view of one of the tape carriers showing the spring loaded contact probes of the respective tape receptacles and showing the LED displays adjacent the respective tape receptacles.

With additional reference now to FIGS. 3A and 3B, one of the slots 30 is illustrated in greater detail. As may be seen in FIG. 3A, the slot 30 is of generally rectangular configuration in plan, and, as seen in FIG. 3B, the vertical dimensions thereof are adapted to clear the outer edges of a tape cartridge 10 inserted therein, the slot having a diagonal upper rear surface 34 adapted to receive the diagonal section 16 of a respective tape cartridge 3B. A resiliently biased probe arm 36 (FIG. 3A) having a probe member 38 on its distal end is provided in the rear of each slot, as shown in FIG. 4. Referring additionally to FIG. 5B, each probe 38 has first, second, third, and fourth contact members 40a, 40b, 40c, and 40d, which are gold plated and adapted to seat against and provide electrical contact with either contact pads 22a–22d or contact pads 22e–22h (FIG. 5A) of the EEPROM memory device 18 affixed to the respective cartridge 10, as shown in FIG. 3B.

Figure 13:
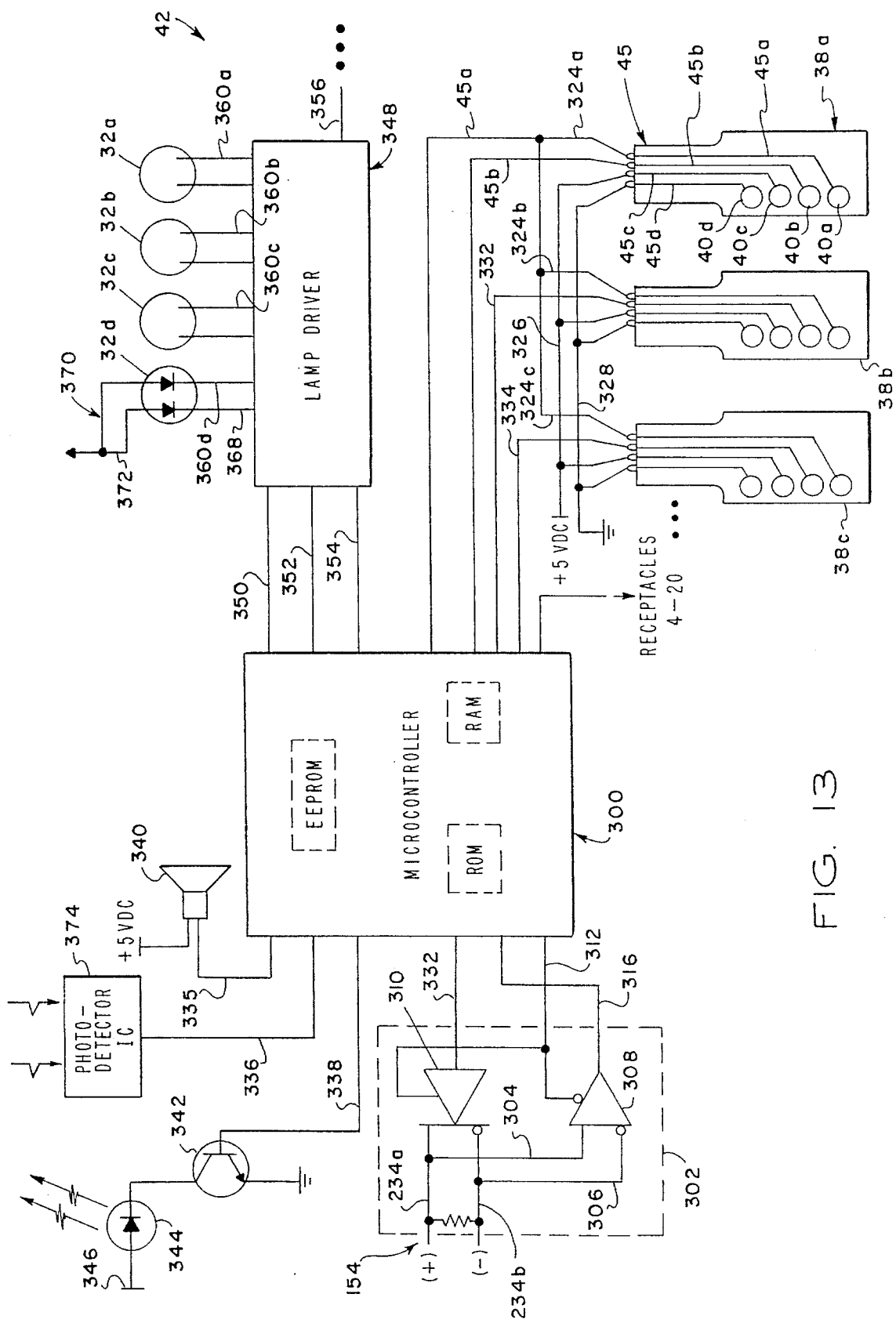
FIG. 13 is a block and schematic representation of the circuitry employed in a representative tape carrier.

The tape carrier circuitry, indicated generally at 42 (FIGS. 3A, 3B) and as will be described hereinbelow with reference to FIG. 13, is electrically connected, through contact nodes 40a–40d, with the non-volatile EEPROM memory 18 of any tape cartridge seated within the carrier slot 30, as will also be described in greater detail hereinbelow. As may be seen more clearly in FIG. 5B, the contact nodes 40a, 40b, 40c, 40d, in the preferred embodiment, are vertically arrayed. As seen in FIG. 5A, the contact pads 22 of the EEPROM of each cartridge 10 consists of a first vertical grouping of contact pads 22a, 22b, 22c, and 22d, and a second grouping of contact pads 22e, 22f, 22g, and 22h positioned in inverted order and to one side of contacts 22a–22d. The probe 38 is slightly laterally displaced from the center of the slot 30, whereby if the cartridge is inserted "upside down," contact pads 22e, 22f, 22g, 22h will contact probe contact nodes 40a, 40b, 40c, and 40d, respectively. Electrical connection is provided between the EEPROM circuitry, through contact pads 22a, 22b, 22c, and 22d, or contact pads 22e, 22f, 22g, 22h, and external data transmission, clock, power, and ground circuit portions, respectively in circuitry 42 within the carrier 12, as will be more fully discussed. It will thus be understood that the slot 30, probe 38 and associated circuitry comprise a tape cartridge receptacle 44 for receiving tape cartridge 10 and for providing electrical contact between the tape carrier circuitry 42, to be described, and the non-volatile memory 18 of tape cartridge 10. Suitably, a flexible conductive strip 45 (FIGS. 3A, 3B) is affixed to the inner surface of resilient probe arm 36, the flexible strip 45 having four conductors 45a, 45b, 45c, 45d (FIG. 13) in electrical connection between contact nodes 40a, 40b, 40c, and 40d, respectively, and portions of circuitry 42 (FIGS. 3A, 3B). Referring to FIG. 4, the slots 30 and probes 38, are vertically aligned, in upper and lower shelves 24 and 26, and LED devices 32 are positioned between the shelves adjacent a compartment portion 46 in which circuitry 42 (FIGS. 3A, 13) is contained. Referring to FIGS. 3A and 3B, the lower surface of slot 30 is recessed below the upper edge surface of a raised, front ridge 46, for retaining the tape cartridge in the slot and in contact with probe 38.

Referring now to FIG. 6, the tape cartridge monitoring system 50, in the present embodiment, includes a central processor or host computer 52 which, in the present embodiment, suitably comprises an IBM-compatible personal computer, preferably having at least four megabytes of RAM memory, at least 40 megabytes of hard drive data storage, and a clock speed of at least 33 megahertz. In the present, illustrative embodiment, the serial input of the host computer 52 is connected to receive tape requests from a mainframe computer 54, the tape requests designating the volser number of a requested tape cartridge 10 and the number of the tape drive 56 in which the requested tape cartridge is to be loaded by an operator. Mainframe computer 54, for example, may be an IBM 3090 unit. A tape cartridge library of several hundred thousand magnetic tape cartridges may be required for such a mainframe unit, depending, of course, upon the particular installation. As will be understood by those in the art, data buffering and conversion units, as indicated at 58 and 60, are required for converting the EBCDIC format data stream generated by the mainframe computer 54 to an ASCII format appropriate for communication with the personal computer employed as the host computer 52. In the present embodiment, an IBM 3174 controller 58 is utilized for buffering such communication between the mainframe computer 54 and the host computer 52, the 3174 interface being a TDS 3174 interface device. The TDS 3174 unit 60, in effect, emulates an IBM 3287-type printer, for providing proper interface with the host personal computer. The controller 58 is associated with an interface section 60 which is connected to a serial input port of the host computer 52, for receiving the data signals.

As an initial overview of the tape cartridge monitoring system 50, the components of which will be described in detail hereinbelow, the host computer 52 is connected through a communications converter unit 62 and a first power data module 64a for polling the tape cartridge carriers 12 associated with the power/data module 64a, and with successive power modules 64b, 64c and associated chains of carriers, to determine the location of a requested tape cartridge, i.e., for determining the aisle, rack and carrier and, optionally, the receptacle in which the tape cartridge having the desired volser number is currently stored. Upon determining the location of the tape cartridge, the host computer 52 transmits a message to a display unit 66 for indicating the volser number and tape cartridge location of the requested tape cartridge and the designated tape cartridge drive into which it is to be loaded.

The host computer 52 is also connected to memory programmer unit 20, which serves to program the non-volatile memories 18 of the respective tape cartridges 10 in response to commands keyed into the host computer 52, as will now be described.

Programming of the non-volatile EEPROM memories 18 is advantageously performed after the memory chips have been affixed to the respective tape cartridges 10. In the first embodiment, as illustrated in greater detail in FIG. 7 and FIG. 8A, the programmer 20 includes a stand-alone programming unit 70a. The digits or letters of the assigned volser number are keyed into the host computer 52 and translated into sequential, digitally encoded signals which are processed by circuitry within the memory programmer 20 and applied to the EEPROM memory 18 (FIG. 1) while the respective tape cartridge 10 and associated memory device 18 is inserted within the programming unit 70a, as indicated in FIG. 8A. Referring to FIG. 8A, the memory programming unit 70a contains the programming circuitry and has a receptacle 72 for receiving one of the tape cartridges 10 in the manner described above with respect to the receptacles 44 of the tape cartridge carriers 12. The receptacle 72 includes a resiliently biased contact arm 73 supporting a contact probe 74 corresponding to one of the carrier receptacles, the probe having four contact nodes not shown, for providing electrical contact with respective contact pads 22 (FIG. 5A) of a tape cartridge 10 inserted into the receptacle 72 in the manner discussed above with respect to the tape cartridge receptacles 44. The memory programming unit 70a thus comprises a separate housing which may be positioned adjacent the host computer 52 for the convenience of an operator during the programming operation, and the receptacle 72 is substantially identical, in its interior arrangement, to the carrier receptacles 44. Alternatively, one of the carrier receptacles could be connected to the circuitry of the programmer 20 for programming the tape cartridge memories. Other, alternative apparatus for programming the EEPROM memories are illustrated in FIGS. 8B, 8C, and 8D, as will be discussed in a later section.

With respect to the first embodiment of the tape programmer 20, as illustrated in FIG. 8A, the tape cartridge programmer 20 is operable for supplying a series of encoded signals to the non-volatile, EEPROM memory chip (FIG. 1) on the respective tape cartridge inserted in the programming unit receptacle 72 (FIG.8A) for storing the volser number in the EEPROM. The process is repeated for each tape cartridge 12 as tape cartridges are added to the library. In normal operation, the operator initially determines the appropriate volser number for the tape cartridge 12, inserts the tape cartridge into the receptacle 72, and keys the volser information into the host personal computer 52. With primary reference now to FIG. 7, the host computer 52 (FIG. 8A) transmits the data to the programmer 20 via the TXD line 76a of cable 76, cable 76 being connected to a serial output port of the host computer. The output signal is suitably in RS232 protocol format, and it is initially received by a conversion chip 80 (FIG. 7), for converting the RS232 format data to TTL format signals. The converter 80 is suitably a Maxim MAX233 conversion chip, which thus serves to convert the +10, −10 volt output signals received from the host computer 52 into TTL logic circuit compatible voltage levels, e.g., zero and +5 volt signals. The TTL format output signals produced by converter 80 are conducted on line 82a to microcontroller 84 in the form of a sequence of six encoded, digital data segments corresponding to the alphanumeric encoded numbers keyed into the host computer 52. The TTL level signals are translated by the microcontroller 84 into waveforms and voltage levels appropriate for recording the encoded data in the EEPROM memory 18 on the respective cassette contained within the receptacle 72 of memory programming unit 70a (FIG. 8A). Microcontroller 84, in the present embodiment, is an 8-bit microcontroller having at least two kilobytes of ROM memory and 256 bytes of RAM memory, suitably a 68HC05C3 unit available from Motorola.

Line 82a is connected to the asynchronous serial input port of 8-bit microcontroller 84, microcontroller 84 additionally having three independently controllable input/output ports connected, respectively, to lines 88a, 88b and 88c. In the present application, output lines 88a and 88b are connected to respective pins of a flexible conductor 90 having first, second, third and fourth flexible conductors 92a, 92b, 92c, 92d respectively connected to gold-plated contact node elements 94a, 94b, 94c and 94d of contact probe 74. The flexible conductor 90 and probe 74 are mounted within the tape cartridge programming unit 70a (FIG. 8A) in the manner discussed above, and the nodes 94a, 94b, 94c, 94d are positioned for contacting respective contact elements 22 of the EEPROM memory device 18 (FIG. 1), affixed to the tape cartridge, upon its insertion in receptacle 72 (FIG. 8A) for programming. Thus, the internal circuitry of the EEPROM temporarily becomes integrated with the circuit of the tape memory programmer 20, FIG. 6.

The ROM memory of the microcontroller 84 is programmed to command the microcontroller to follow a predetermined sequence of commands, as will be described with reference to the flowchart illustrated in FIG. 9, and to send programming data, in I²C bus protocol TTL format, through data line 88a to node 94a of probe 74. The output of microcontroller 84 is timed by its internal clock timer section, in accordance with I²C bus protocol. Timing signals from the timing section are conducted on line 88b via line 92b to contact node 94b. Line 88e is connected between ground and the pin connected through line 92c to node 94c, and line 88d is connected between a +5-volt power source 104 and the pin connected to line 92d and contact node 94d. Output line 88c is connected to one terminal of a suitable, low voltage buzzer 108 or the like, the other terminal of buzzer 108 being connected to positive +5-volt power supply terminal 109.

A crystal oscillator circuit 96 is employed for setting the clock speed, suitably four megahertz, of the microcontroller 84, the output of the crystal oscillator being fed to the first and second oscillator inputs of the microcontroller. A reset circuit 98, which also functions as a voltage monitoring circuit, is provided in connection with the reset input of the microcontroller 84 and is suitably a TL7757 reset controller chip. The reset circuit 98 is connected between the reset input of microcontroller 84 and the source (not shown) of input power voltage applied to the microcontroller 84. The purpose of the reset circuit 98 is to delay start-up of the microcontroller 84, during a power-up stage, until the input voltage is stable and until the oscillator 96 is functioning at a stable frequency, which normally occurs in a few hundred microseconds. In operation, the reset circuit 98 switches from a non-conductive to a conductive state when the input power voltage reaches a certain threshold, in this case, +4.61 volts. The reset circuit 98 is also effective to shut off the input power applied to the reset terminal of microcontroller 84 upon the input power voltage falling below a predetermined level, e.g., +4.59 volts. Suitable power supply outputs, not shown, are connected to the respective components of the circuit of programmer 20.

To summarize the operation of the circuit of programmer 20, the control program stored within the ROM memory of the microcontroller 84 is operable upon receipt of a programming message on line 82a from the converter 80 for effecting the sequential transmission of encoded information, in I²C bus protocol TTL format, to the EEPROM memory device 18 (FIG. 1) contacted by raised contact node elements 94a–94d. The programming commands are initiated by keying the respective volser number into the host computer 52 and transmitting the command on cable 76 to the programming unit 20. Once the EEPROM memory 18 is programmed, a signal is fed through the third output line 88c to the buzzer 108 for alerting the operator to an all-clear condition in which the selected volser number has been properly programmed into the EEPROM memory device.

Figure 7:
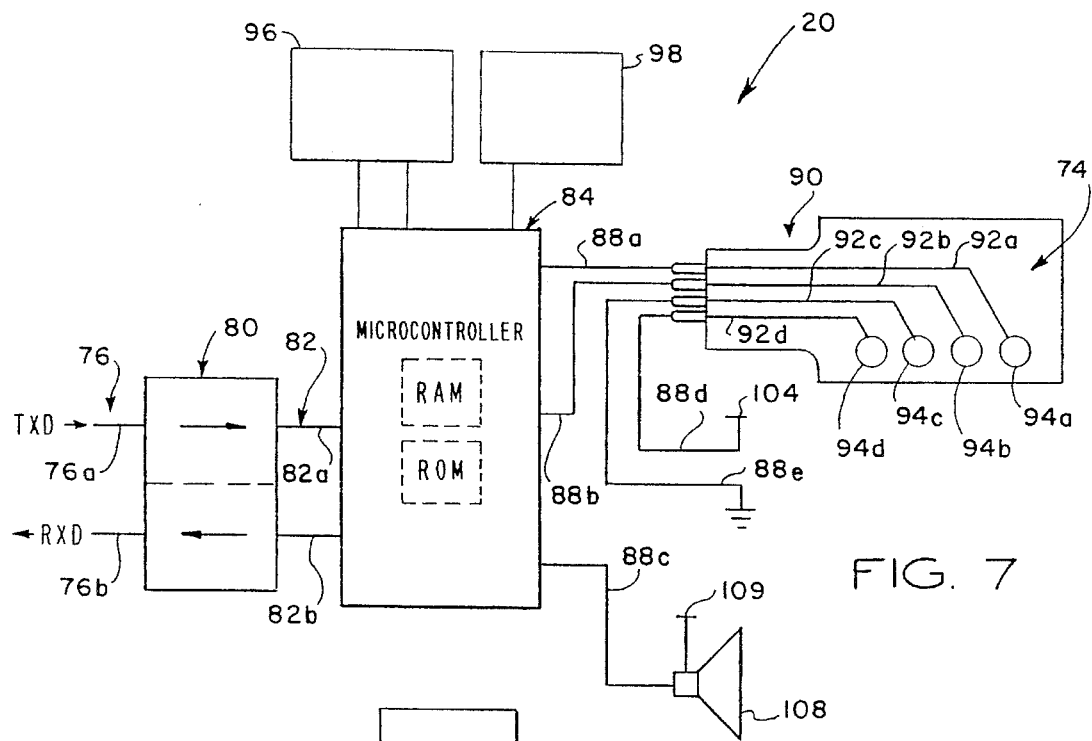
FIG. 7 is a block diagram of a tape programming system.
Figure 9:
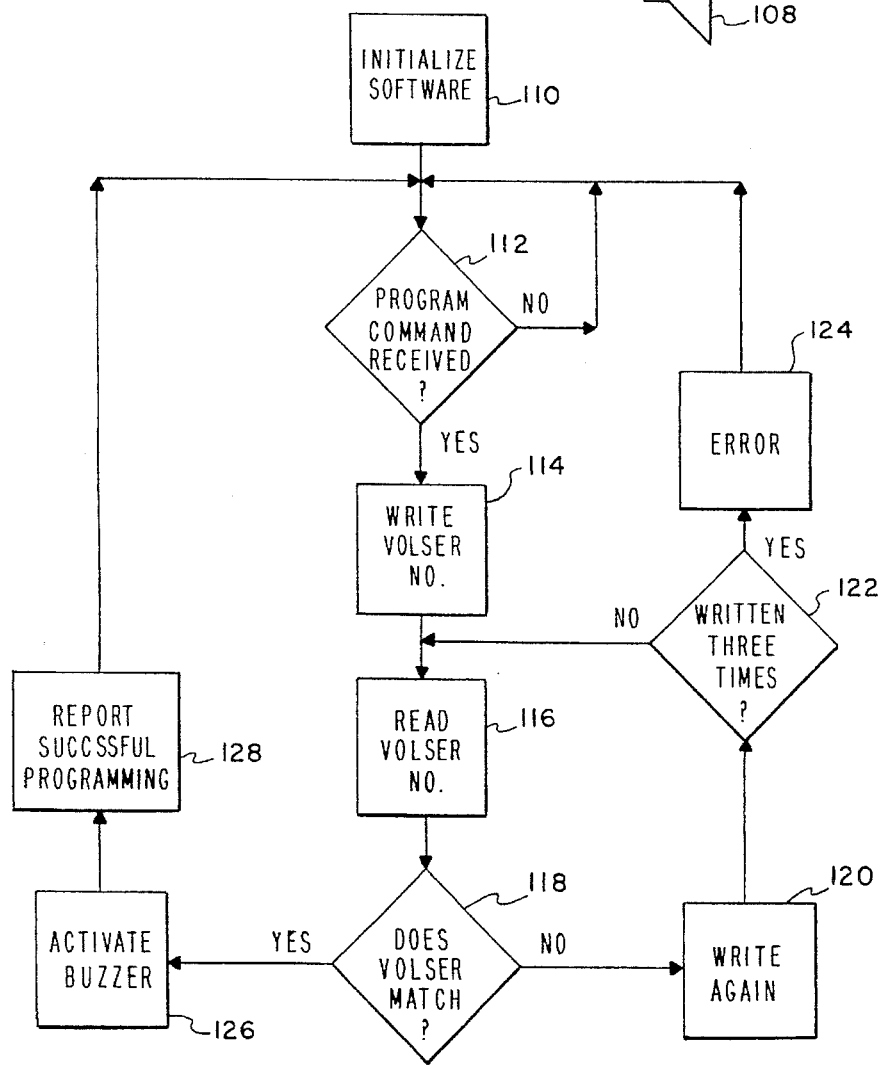
FIG. 9 is a flow chart illustrating the procedure for programming the volatile memory of one of the tapes utilizing the programming system of FIGS. 7 and 8A.

Referring additionally now to FIG. 9, the operation of the microcontroller 84 (FIG. 7) in response to the series of commands stored in its ROM memory section will now be described with respect to the flowchart of FIG. 9. At step 110, the programmer circuit is initialized or powered up by the application of the reset signal by the reset circuit 96 (FIG. 7). At step 112, the program determines whether a programming message has been received from the host computer 52 (FIG. 6) through the level converter section 80. If the answer is yes, at action block 114, the microcontroller is commanded to transmit the encoded series of signals, containing the volser programming message, via data output line 88*a* to raised contact node 94*a* and to the EEPROM memory, whereby the volser number is written into the EEPROM memory of the respective tape cartridge by the microcontroller 84. The clock output line 88*b*, connected to line 92*b* and raised contact node 94*b*, simultaneously transmits control signals to write the data into the EEPROM. Subsequently, the program goes through a series of checks, and, at action block 116, it checks the recorded volser number by reading the EEPROM memory and transmitting the result back to microcontroller 84. As indicated at inquiry block 118, the microprocessor then determines whether the recorded volser number is identical to the number which was received from the host computer 52. At block 120, if an error is received, the readout is repeated. At step 122, after three repetitions of a negative response, an error message is sent on lines 82*b* and 76*b* (FIG. 7) to the host computer 52, as indicated at step 124 (FIG. 9). Signals sent in TTL format on line 82*b* from the microprocessor 84 are converted to RS232 format by converter 80 for transmission back to the host computer 52. If, however, the volser number read from the EEPROM is correct, i.e., if it matches that originally transmitted to the EEPROM by the microcontroller, as indicated at action block 126, the microprocessor initiates an output on line 88*c* (FIG. 7) activating the buzzer 108 for audibly indicating to the operator that the EEPROM memory has been correctly programmed. Additionally, at action block 128, an acknowledgement message is sent back to the host computer 52 to reset the host computer to receive a subsequent programming command, including the next volser number intended to be recorded in the EEPROM memory (of another) tape cartridge.

When the EEPROM memories 18 of each of the tape cartridges 10 intended to be maintained and stored in the tape cartridge library are programmed with their respective volser numbers, the cartridges may be inserted into any of the tape cartridge receptacles 44 of the tape cartridge carriers 12, in any order desired. As suggested above, they are advantageously positioned and arranged in an order in which those tape cartridges which are to be used most often in the particular program to be run by the mainframe computer 54 are located as close as possible to the respective tape cartridge drive 56 in which they will be loaded. This random order storage of the tape cartridges is made possible in the present system because of the use of the non-volatile memories 18 associated with each tape cartridge for carrying the encoded volser number, and the localized, stand-alone polling systems within the carriers, and because of the operation of the communications network during polling, as will be described.

Whereas the tape memory programmer 20, as thus far described with reference to FIGS. 7, 8A, and 9, permits programming the non-volatile memories 18 associated with respective tape cartridges utilizing keyboard entry of the volser numbers, other embodiments of the tape programmer 20 may also be employed. One disadvantage of the first embodiment is that errors may occur during the keying procedure. With respect to the second embodiment, as shown in FIG. 8B, keying the entries into host computer 52 is not required. The tape memory programming unit 70*b* and circuitry of the second embodiment is identical to that described above with reference to FIG. 8A, but a bar code reader 128, rather than a keyboard, is employed for entering the volser numbers into the host computer 52. In this embodiment, each of the tape cartridges is necessarily provided with a bar code label in which the volser number of the tape cartridge is encoded. As each new cartridge is received, the operator scans the bar code label to enter the volser number into a memory within the host computer. The tape cartridge is then inserted in the receptacle 72 of programming unit 70*b*, and the host computer is operable, or is instructed to, transmit the encoded volser number via line 76 to the circuitry within the programming unit 70*b* for effecting processing of the data signals and encoding the volser number in the non-volatile EEPROM memory of the respective tape cartridge 10. Thus, the possibility of data entry errors by the operator is reduced.

Referring to FIG. 8C, in a third embodiment 20*c*, an additional tape drive unit 132 is connected to an input of host computer 52, the tape drive unit 132 being operable to receive a tape cartridge, having an EEPROM memory desired to be programmed, and to read the tape's volser number from an initial portion or leader of the tape itself. The volser number read from the tape is: fed into the host computer 52; temporarily stored in a memory of the computer; and subsequently fed to the programming unit 70*c* for processing and recording in the tape EEPROM, in the manner previously described. Thus, each tape cartridge must first be inserted in the tape drive 132, and the volser number read from the tape into a memory of the host computer 52. The tape cartridge is then removed from the tape drive 132 and inserted into the programming unit 70*c* for programming of the EEPROM memory. The apparatus illustrated in FIG. 8C, and the method of its use for programming the tape memories, thus provides the advantage that human error in reading and/or entering the volser number into the host computer 52 is virtually eliminated. However, the method is somewhat slower than those of FIGS. 8A, 8B, and 8D because of the necessity for loading each tape into the tape drive 132 and reading a portion of the tape into the computer prior to inserting the tape into the receptacle 72 of programming unit 70*c*.

Referring to FIG. 8D, in a fourth embodiment 20*d*, an auto-loading tape feeder unit 134 is employed for sequentially and automatically feeding the tapes into a tape drive transport 136 having a built-in tape memory programming unit 70*d*. Such automatically loading tape drive units are commercially available, and modification of the tape transport for integrating the programming unit 70*d* therein is accomplished by installing a four-contact probe, not shown, positioned to be in alignment with the EEPROM contact pad 22 (FIG. 1) of an inserted cartridge 10, for transmitting the encoded volser number to the EEPROM to program the EEPROM. An additional, control computer 138 is connected to the tape drive transport 136 and the built-in memory programmer 70*d*, the control computer being programmed to command the tape loading mechanism 134 sequentially to load tape cartridges into the tape drive transport 136, and then to command the tape drive 136 to read the volser number from a respective tape loaded in the tape drive transport and to transmit the volser number to the control computer 138. The control computer 138 then commands the memory programming unit 70*d* to process the volser-containing signal and write the volser number into the EEPROM memory of the tape cartridge. Subsequently, the tape cartridge is ejected from the tape drive 136, and a new tape is automatically loaded by the tape loading mechanism 134. This embodiment is essentially error-free in its operation, since the volser number of each tape cartridge is read from the tape without operator input, and it is adaptable for the automatic programming of large numbers of tapes.

Turning now to the operation of the tape cartridge monitoring system 50 in response to a tape cartridge request, and with initial reference to FIG. 6, tape cartridge requests are normally initiated by the mainframe computer 54 in the form of an encoded message containing the volser number of the requested tape cartridge 10 and the number of the tape cartridge drive 56 in which it is to be mounted. The message is buffered in controller 58 and routed to interface circuit 60, which converts and transmits the tape cartridge request in ASCII format to the host computer 52. When the host computer 52 receives a tape cartridge request, in the form of a data segment in which the volser number of the selected tape cartridge and the designated tape cartridge drive is encoded, it is operable to transmit a tape cartridge request message, in RS232 format, along cable 150 to communications converter 62, to be described in detail hereinbelow, which is operable to convert the request to RS422 protocol differential voltage format. The output signal, in RS422 format, is transmitted on cable 152 to the first power/data module 64a, from which it is sent on cable 154 to a chain of tape cartridge carriers, of which only carrier 12a is shown, connected thereto. The output signal is conducted to polling circuitry, to be described, within the respective tape cartridge carriers 12, for determining whether the selected tape cartridge is present within one of the receptacles 44 of one of the tape carriers. Whereas for clarity of description only a single tape cartridge carrier 12a is shown in FIG. 6 as being connected to the first power/data module 64a, in a typical application for a large tape cartridge library incorporating thousands of tape cartridge carriers, each power/data module 64 is operatively connected with up to about seven chains of carriers, as indicated at 160a, 160b, and 160c, each chain having up to about twelve carriers.

With continued reference to FIG. 6, the tape cartridge request is also transmitted via cable 158 to the next successive power module 64b and is transmitted therefrom, in RS485 differential voltage format, to any tape cartridge carriers, such as carriers 12b–12j, associated therewith. Whereas power data module 64b is connected to a plurality of up to seven chains of tape cartridge carriers, only two chains 160a and 160b are shown, the first tape carrier chain 160a including tape carriers 12b, 12c, 12d, 12e, and up to eight other tape carriers, not shown, interconnected in daisy chain series. Thus, each power data module 64 is effective for transmitting tape cartridge requests and for receiving and returning tape cartridge location messages to and from several chains of tape carriers. Since, as indicated above, each power data module 64 is reliably connected to up to about seven chains of carriers each having up to about 12 tape cartridge carriers, each power/data module 64 is capable of providing power and data transmission to about 84 tape carriers, for polling up to about 1680 tape cartridges. Accordingly, approximately 300 (298) power/data modules 64 would be required in a tape cartridge library of 500,000 tape cartridges.

Because of the large numbers of tape carriers to be polled and the substantial distances between many of the tape carriers and the host computer 52, the communications network, indicated generally at 166 in FIG. 6, is provided. Network 166 comprises communications converter circuit 62; power data modules 64a, 64b, 64c; signal conversion and transmission circuitry, to be described, within the converter 62, the power/data modules 64, and the tape carriers 12; message relay circuitry within each respective tape cartridge carrier 12; and associated cables. Communications network 166 is adapted for enhancing the transmission of tape cartridge requests throughout the system, and the return transmission of tape cartridge location messages, for minimizing the complexity of the system and reducing the number of cables required for interconnecting the various components. Whereas the tape cartridge request messages produced by the host computer 52 are in the form of low voltage level, RS232 format signals, it is not practicable to transmit such RS232 signals over the long distances entailed, the tape carriers 12 being located at various positions throughout the tape library. Moreover, such RS232 transmissions may not be made utilizing standard, inexpensive, six-conductor telephone cable. Additionally, it would be difficult and very expensive to utilize a conventional message distribution system having cables directly interconnecting thousands of carriers 12 and the host computer 52. Further, it would be difficult to re-direct a returned message from one of the carriers 12, having a selected tape cartridge, without the transmission and signal conversion network 166 of the present invention, as will now be described.

Figure 10:
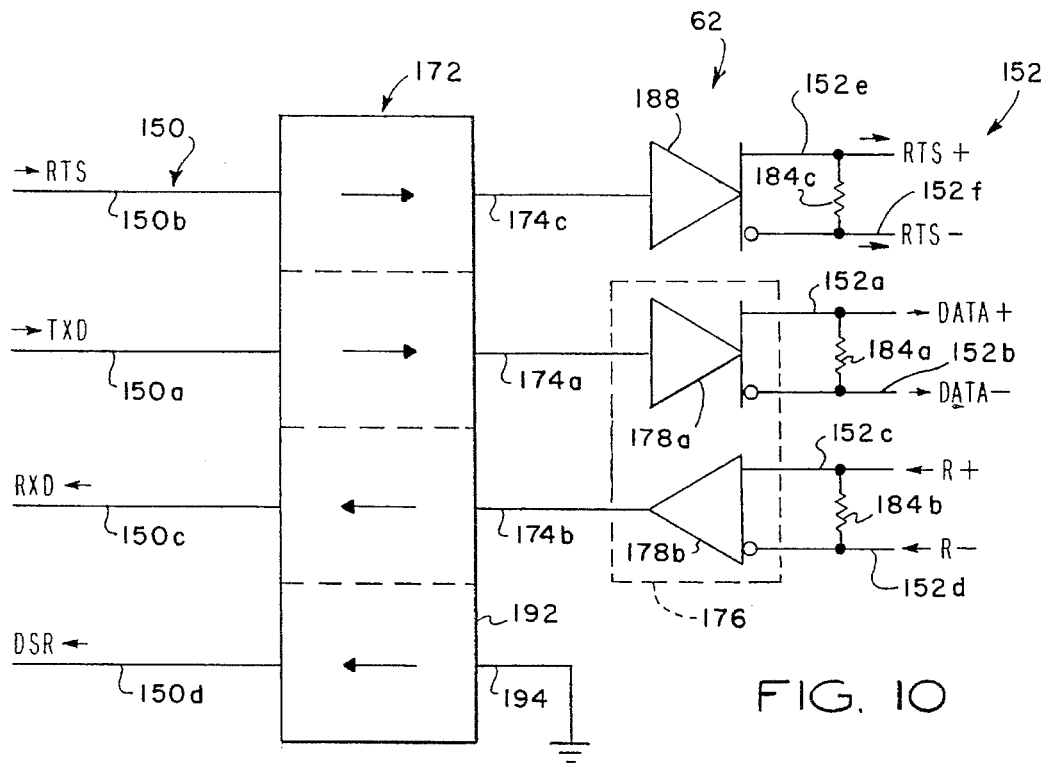
FIG. 10 is a block and schematic representation of the circuitry employed in the communications converter.
Figure 11:
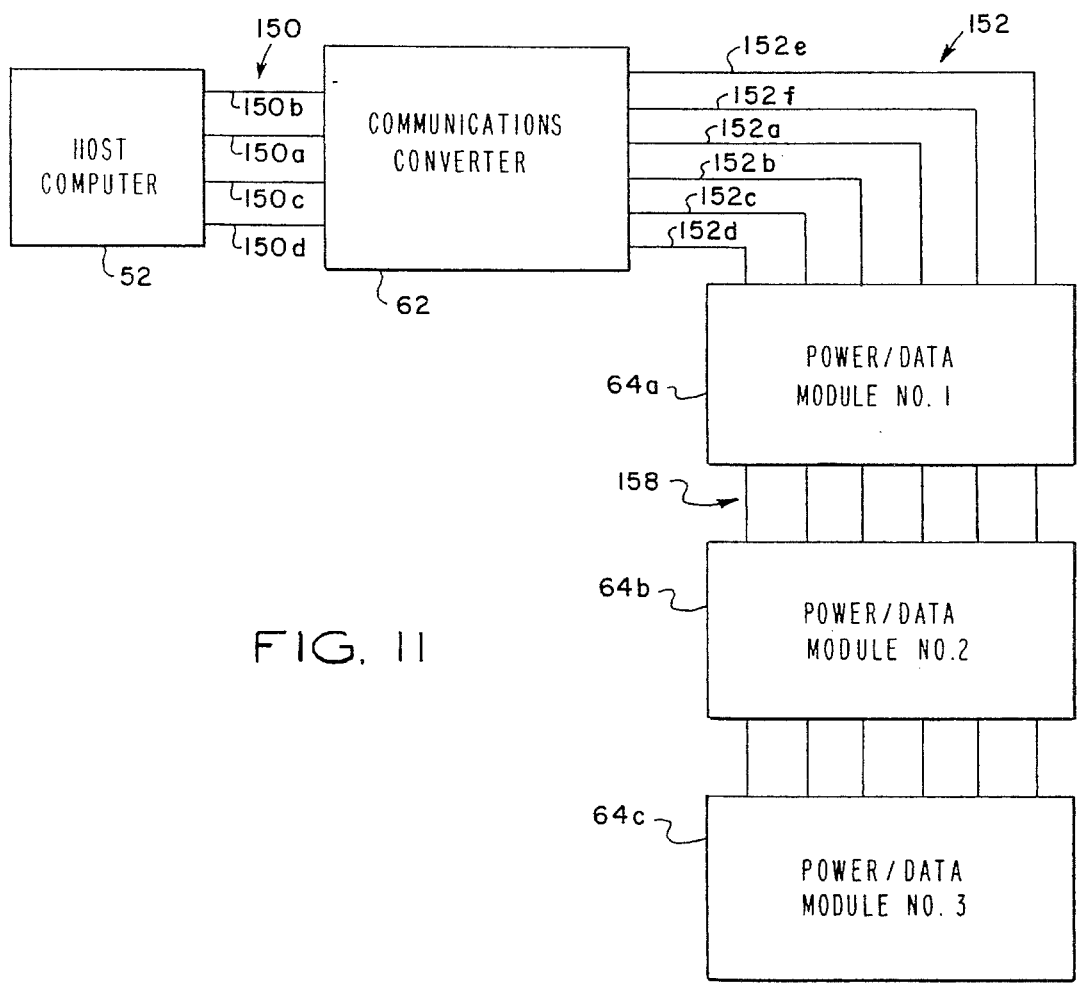
FIG. 11 is a block diagram showing the interconnection of the host computer, communications converter, and the power/data modules.

Referring now to FIGS. 10 AND 11, communications converter 62 is connected between the host computer 52 (FIG. 11) and the first power data module 64a for converting transmitted tape cartridge requests, received from host computer 52 in RS232 format, to RS422 differential voltage format, whereby output cable 152 is suitably a conventional six-conductor telephone cable. By converting the RS232 protocol signals received from the host computer 52 to RS422 differential voltage signals, the converter 62 thus translates the signals into a form suitable for communications over substantial distances as great as 4,000 feet, utilizing standard, six-conductor twisted telephone lines. Similarly, as will be discussed in greater detail, the power/data modules 64 are operable to relay tape cartridge request messages in RS422 differential voltage format to the other power/data modules, in daisy-chain sequence, and to relay messages in RS485 format throughout the associated chains of tape carriers 12.

Such differential voltage formats are effective for such long-distance transmissions because noise and other spurious signals do not significantly degrade the differential voltage signals. As previously noted, such a communication network 166 is necessary in the present system because of its intended application in large data processing tape libraries and the like, in contrast with prior-art systems of limited size, in which video tape cartridges are required to be stored in a fixed order, in designated receptacles.

The output of the host computer 52 (FIG. 11) is transmitted in RS232 standard on T×D line 150a (FIG. 10) connected to converter circuit 172, which is suitably a Maxim MAX233, and output on line 174a to one side of a line driver unit 176, which is suitably a 75179B manufactured by Texas Instruments, Inc. Line driver 178a of dual driver unit 176 is operable to convert the applied signal to a differential voltage signal on lines 152a and 152b. If, for example, the input on line 174a is zero, the output on line 152a will be zero and that on line 152b will be +5.0 volts. If the input voltage is raised, for example, to five volts, the output on line 152b will be zero and the output on line 152a will be +5 volts. An impedance matching resistor 184a, suitably of 120 ohms, is connected across the output leads 152a, 152b. As shown in FIG. 11, the output of the communications converter 62 is fed, on leads 152a, 152b of cable 152, to the first power/data module 64a, to be described, which, in turn, transmits the tape cartridge request information to the associated chains of smart tape carriers, as shown in FIG. 6. Return data messages received from the individual tape carriers are transmitted via the power data modules, as will be described, and are ultimately received by the communications converter (FIG. 11) in RS422 format on lines 152c and 152d, which are the R+ and R− lines, respectively.

Input lines 152c and 152d are interconnected by impedance matching resistor 184b and are connected to the input terminals of line driver section 178b, which is the second half of the line driver unit 176. Line driver section 178b converts the signals to TTL level, digital format, and they are output on line 174b through a second input terminal of the level conversion circuit device 172 to output line 150c, which is connected to the serial input port of host computer 52 (FIG. 11). As will be described hereinbelow, the return signals fed to the computer 52 on line 150c provide the location and identification of an individual tape cartridge carrier in which a requested tape cartridge is stored.

A "data direction" input signal received from the host computer 52 on line 150b provides a data direction indicator for the power/data modules 64, the direction signal being conducted on line 174c to a driver 188, suitably comprising half of a second 75179B chip, the output of which is an RS422 differential signal fed on lines 152e and 152f as RTS positive and RTS negative signals, to the first power/data module 64a (FIG. 11). This data direction signal provides information to the power data module 64a as to which direction the data signals are currently flowing, i.e., whether the host computer 52 is sending or receiving information. As in each of the drivers, an impedance matching resistor 184c is connected between lines 152e and 152f. Finally, the MAX233 chip includes a DSR ground converter section 192 connected between grounded lead 194 and input line 150d, which is connected to the host computer 52. The ground potential on the input line 150d is thereby converted to plus 10 volts by level converter 192, and fed back to the host computer 52 through line 150d, indicating to the host computer that the communications converter 62 is properly connected.

Figure 12:
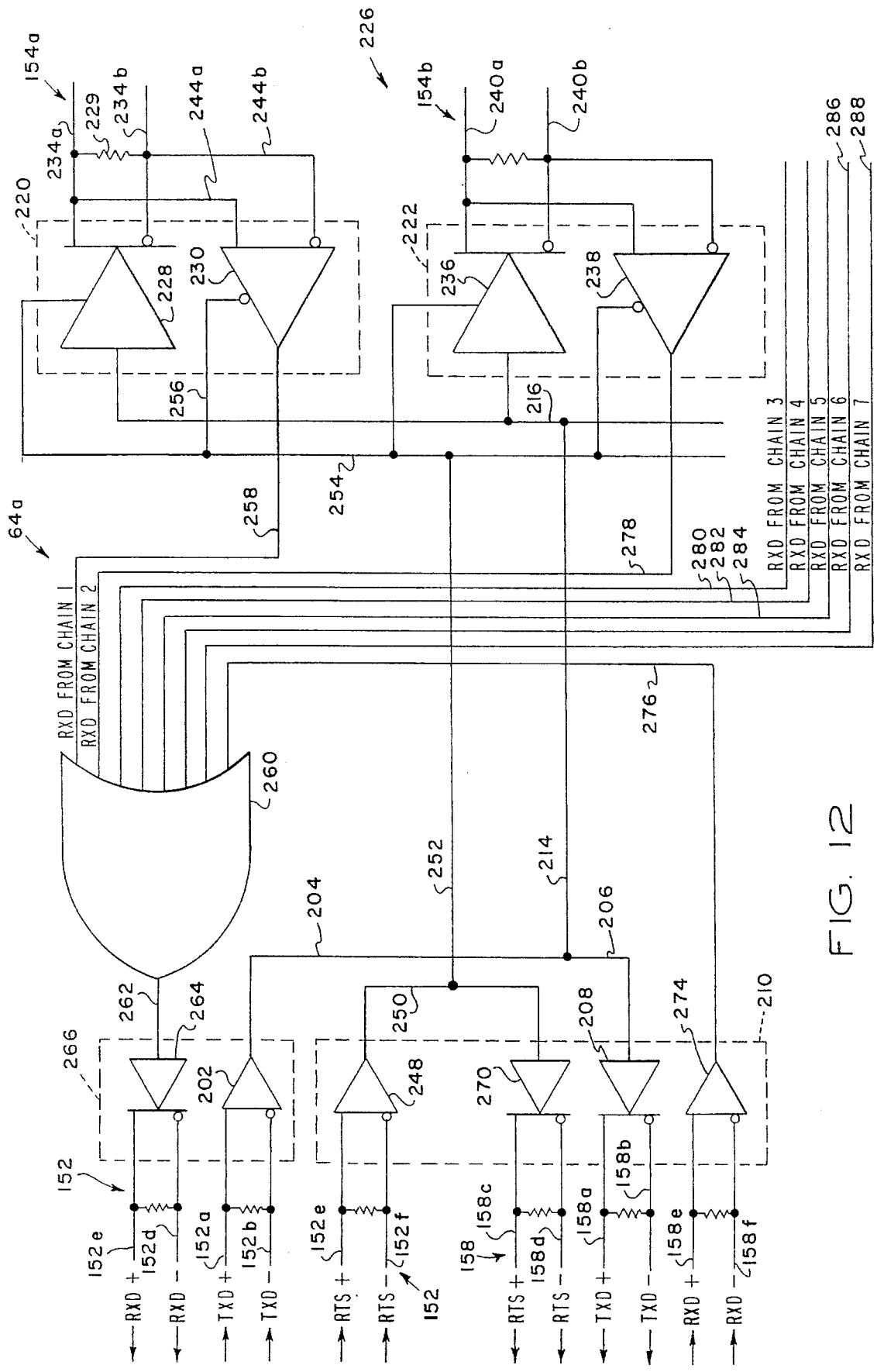
FIG. 12 is a block and partially schematic diagram of one of the power/data modules.

Referring now to FIG. 12, and with additional reference to FIGS. 10 and 11, the circuitry of power/data module 64a, which is representative of the other power/data modules, 64b, 64c . . . , will now be described. The power/data modules 64 provide a unique system for splitting and distributing transmitted data and for combining received data, in several protocols. The operation of the power/data modules 64 permits the system to poll large numbers of carriers 12 (FIG. 6) and to transmit a data signal received from one of the many hundreds of carriers back to the converter 62 (FIG. 6) on lines 152c, 152d of cable 152, and thence to the host computer, on line 150c (FIG. 10). As seen in FIG. 12, input cable 152 serves to receive voltage differential, RS422 protocol signals from the communications converter 62 (FIG. 10), on lines 152a, 152b, connected to the differential input pins of line driver 202, which suitably comprises one half of an RS422-to-TTL voltage level converter, such as a Texas Instruments Model SN75179B chip. The differential voltages are thus either zero and +5 volts, or +5 volts and zero. If they are +5 volts and zero, a "high" output signal is transmitted on line 204 and, via line 206, through line driver transmitter 208, through the output cable comprising lines 158a and 158b, to the next power/data module 64b (FIGS. 6, 11) and sequentially to the other power/data modules. Line driver 208 is suitably a part of a four-driver IC circuit chip 210 such as an SN751178 Texas Instruments chip. Such a "high" signal, on line 204, is also conducted via connected line 214 to bus 216.

A plurality of bi-directional, RS485-to-TTL voltage level conversion and transceiver circuits 220 and 222 are provided for converting the digital TTL signals received from driver 202 to differential voltage RS485 format for transmission to the respective chains of tape carriers associated with the power/data module 64a. The conversion circuits 220, 222 are suitably voltage level conversion chips such as Texas Instrument SN75176B chips. The conversion section, indicated generally at 226, may thus include up to seven RS485-to-TTL transceivers such as circuits 220, 222, for communicating with up to seven chains of tape carriers. As indicated above, up to 12 tape carriers 12 are incorporated in each chain. The tape carriers 12 in each chain are suitably interconnected in daisy chain sequence as will be described hereinbelow. With continued primary reference to FIG. 12, a tape cartridge request, including the volser number of the required tape cartridge, is transmitted in TTL format on bus 216 to the "transmit" half of gated "transmit" driver 228 of the first transceiver 220, the transmit driver 228 being paired with a "receive" half, comprising a gated line driver 230 connected in the reverse direction. The transmitter driver 228 is connected to first and second output lines 234a, 234b, of cable 154a. An impedance matching resistor 229 is connected across the output lines 234a, 234b, and similar resistors of appropriate resistance values are connected across the outputs of each of the other drivers and gated drivers within the circuit. Similarly, second transceiver section 222 includes a gated transmitter driver 236 and gated receiver driver 238, the output of transceiver 236 being connected on cable 154b, on lines 240a, 240b, to the first tape cartridge carrier of a second chain of carriers associated with power/data module 64a. As will be discussed below, in response to a tape request message, the particular tape carrier 12 which includes the requested tape cartridge will generate an affirmative response or "return" message having an identification number designating the location of the carrier and the requested tape. If, for example, the return message is received on cable 154a from the first chain of carriers, it is conducted through leads 244a, 244b to the inputs of "receive" driver 230.

Circuitry is also provided for preventing interference which would result from simultaneous "send" and "receive" transmissions, by selectively enabling respective gated drivers. For example, when it is required to enable the receiver drivers, e.g., drivers 230, 238, an RTS signal received on the RTS input cable section, comprising lines 152e, 152f, is lowered, and the TTL format output of gate 248, on line 250, is lowered, lowering the potential on line 252 and bus 254. Accordingly, return driver 230 is enabled, by the drop in gate potential on line 256, and conducts any signals received from the first chain of carriers back on line 258. Return line 258 is connected to one of the inputs of a multisection OR gate 260, the output of which is connected on line 262 to transmit driver 264 of the RS422-to-TTL converter. The return signal providing the carrier location number is thus conducted through lines 152c, 152d of cable 152, as also shown in FIG. 11, back to the communications converter 62, and a corresponding RS232 signal is thus conducted back to the host computer 52 to actuate host computer 52 and initiate the display panel 66 (FIG. 6).

With continued reference to FIG. 12, "send" and "receive" signals are thus isolated by appropriately timed enabling signals applied to the enabling inputs of respective pairs of the gates 228, 230, 236 and 238, under the control of host computer 52 (FIG. 6). For example, the TTL output on lines 250, 252, and bus 254 is high when the host computer is sending data, and low when the host computer is receiving data. Additionally, a directional control signal sent through gate 248 on line 250 is also sent through gate 270 and through RTS signal lines 158c, 158d to the next power/data module 64b (FIG. 6).

Gate 274 of circuit 210 is connected by input lines 158e, 158f to corresponding R×D signal transmitter circuit elements in successive downstream power/data modules. The input leads, corresponding to leads 158e, 158f, in the corresponding gate in the very last power/data module, not shown, of the system are interconnected by a communications terminator 274 (FIG. 6) which suitably comprises a shunt conductor connected across the input terminals of the receive driver of the last power/data module. The purpose of communications converter 274 is to ensure that the return driver output (equivalent to the driver output to line 276 of FIG. 12) of the last power/data module is maintained at zero volts, to prevent spurious return transmissions which could otherwise occur due to noise or interference.

The other inputs of the multisection OR gate 260 are connected via lines 278,280, 282,284,286, and 288 to receive TTL protocol signals received, e.g., through converter 222, with respect to line 278, and through corresponding further converter circuits, not shown, connected to receive data from respective ones of the up to seven chains of tape carriers which power/data module 64a supports. Accordingly, if a signal received from any of the tape carriers is converted to TTL format and transmitted on lines 258, 278, 280, 282, 284, 286, or 288, OR gate 260 is effective to conduct the return signal on line 262 to enable gate 264 for transmitting the message back on lines 152c, 152d. Such a return message identifies the carrier having the requested tape cartridge. Each of the power/data modules 64 includes a corresponding multi-segment OR gate for receiving such a return signal, and a conversion circuit, corresponding to conversion circuit 266, for converting the TTL protocol signals to RS422 differential voltage format for transmission to the next preceding power/data module, or, in the case of the first power/data module 64a, for transmission to the communications converter 62 and host computer 52 (FIG. 6). OR gate 260 is also connected through input line 276 with the R×D data outputs of the next successive power/data module 64b (FIG. 6), for receiving the outputs of the corresponding multi-input OR gate, not shown, of power/data module 64b, which, in turn, is similarly connected to the next successive modules. Accordingly, a positive identification or "match" signal received from any of the chains of carriers associated with any of the successive power/data modules will be received on line 276 and transmitted through OR gate 260, and converter 266, to the communications converter 62 and host computer 52 (FIG. 6).

Summarizing the advantages of the above-described communications network 166 (FIG. 6), because the digital tape request signals, and any return signal, are translated from RS422 protocol to TTL protocol within each power/data module and then retransmitted in RS422 format, there is little signal loss as the signals are transmitted between the respective modules. The interconnecting cables, utilizing RS422 protocol, inherently have very little loss. Further, each power/data module addresses only one other, sequentially connected power/data module. Also, since the signals are translated from RS422 format to TTL format and subsequently driven by the respective drivers within the modules, the signals are slightly amplified within each module before it is transmitted to the next module. Similarly, when the unique, carrier identification number is returned from one of the respective carriers, a similar advantageous effect accrues, in that the return signal is amplified, for example, converted to TTL format, transmitted through the OR gate 260, and again amplified at the transmitting driver, such as driver 264 and transmitted in RS422 format to the next power/data module. Accordingly, the above-described network 166 provides important technical advantages in that the 422-to-TTL converters not only serve to convert the signals to TTL format within each module, but also to provide sufficient signal amplification for providing a good signal-to-noise ratio in the network 166 as the signals are passed from one power/data module to the next down the line, and from and to the host computer 52. Additionally, the use of RS-422 or RS-485 differential voltage protocol minimizes noise which would otherwise occur in the cables extending from the power/data modules. Similarly, the data transmission and conversion circuits interconnecting the tape carriers of the respective chains of carriers provide low-noise data transmission, as will now be described.

Polling of the tape carriers 12 by the host computer 52 to locate a requested tape cartridge thus entails the initial transmission of a tape cartridge request through the communications converter 62, the message being received on lines 152a, 152b (FIG. 12) at the first power/data module 64a in RS422 format, subsequently transmitted in TTL format on lines 204 and 214 and on bus 216, and simultaneously transmitted in RS485 format on pairs of lines 234a, 234b and 240a, 240b, to the respective chains of tape carriers (FIG. 6) associated with the respective power data module 64a. Referring additionally now to FIG. 13, the circuitry 42 of the representative tape cartridge carrier 12a (FIG. 6) will now be described in greater detail. Each tape cartridge carrier control circuit 42 includes an eight bit microcontroller 300 for sequentially reading the respective EEPROM memories 18 of the microchips of the tape cartridges 10 seated in the respective tape cartridge receptacles 44 of the carriers, the contacts of the EEPROMs being in electrical contact with the contact nodes of the probes, such as contact nodes 40a 40b, 40c, 40d of probe 38a. A tape cartridge request signal is received from power/data module 64a in RS485 format on lines 234a, 234b of cable 154. Tape cartridge request messages received on lines 234a, 234b thus comprise analog differential-voltage signals, which will either be zero and +5 volts, or +5.0 volts and zero volts, on respective input lines 234a, 234b. The incoming signals are fed to the respective terminals of a voltage level converter chip 302, e.g., an RS485-to-TTL converter chip such as an SN75176B chip manufactured by Texas Instruments. TTL level input signals are fed via lines 304 and 306 to the input terminals of a first "receive" gated driver 308, and a second gated driver (transmit driver 310) has its output connected to lines 234a, 234b. Receive driver 308 is enabled if voltage on line 312 is zero, whereby the RS485 differential voltage inputs on the two leads 304, 306 are converted to a single TTL signal on lead 316, which is connected to the asynchronous serial data input port of the eight-bit microcontroller 300.

The microcontroller 300 is suitably a Motorola MC68HC05C3 chip having 4K bytes of ROM memory, 256 bytes of RAM, and at least 64 bytes of EEPROM memory, as in the circuit of the tape cartridge programmer 20 of FIG. 6. Receipt of an input signal on leads 234a, 234b thus initiates the microcontroller 300, which will be described hereinbelow in greater detail with reference to the flowchart of FIGS. 14A and 14B. The microcontroller 300 is also operable to poll the EEPROM memories of the up to 20 tapes stored in the respective receptacles of the associated tape carrier 12. Tape cartridge memory data line lead 45a is fed to the common data bus 322 which is connected by leads 324a, 324b, 324c et seq. to the respective data contact nodes 40a et seq. of each of the respective probes 38a, 38b, 38c, et seq. It should be understood that whereas only three probes 38a, 38b, 38c are shown in the drawing, each of the twenty tape cartridge receptacles 44 of the associated tape carrier 12 includes a respective probe. A +5 volt DC power source is connected on line 326 to nodes 40c of each of the respective probes 38, and ground conductor 328 is connected to the nodes 40d of each probe, for supplying power to the EEPROM chips of the respective tape cartridges received in the respective tape cartridge receptacles 44 (FIG. 3A). This 5-volt power energizes the EEPROM memory chips of each of the tape cartridges.

Polling of each of the chips is performed sequentially, in an ongoing, sequential polling process, in response to successive enable signals applied on memory clock lines 45b, 332, 334, et seq. The memories of the respective EEPROM chips of the respective tape cartridges are thus read sequentially, in response to signals from the timing circuit. Thus, the clock signals are sent sequentially along lines 45b, 332, 334, et seq. to activate the EEPROMs. When activated, the volser numbers of the respective EEPROMS are conducted through the data lines 324a, 324b, 324c, et al., through the data bus 322 and data line 45a, to the microcontroller 300. The series of up to 20 volser numbers thus read from the EEPROM memories of any tape cartridges currently received in the associated tape carrier are stored in the RAM memory section of microcontroller 300 and subsequently compared within the microcontroller 300 to the requested tape cartridge volser number received on line 316. The volser numbers of the tape cartridges 10 stored within the receptacles 44 of the tape cartridge carrier 12a are thus collected by a repetitive, ongoing polling procedure, and stored in the RAM memory of the microcontroller. In the event of a match, a carrier number and location number of the matching tape is output on line 332, to activate gated driver 310 to send a return signal in RS485 format on lines 234a, 234b of cable 154, back to the host computer 52 through the communications network 166 described above.

To complete the description of the circuit 42 illustrated in FIG. 13, the microcontroller 300 also includes three input/output ports connected via respective lines 335, 336, and 338 to respective peripheral units, now to be described. The first input/output port is connected via line 335 to an audible device such as a buzzer 340. The buzzer 340 is a low-current device such as a Mallory Sonalert buzzer, and is activated when the normally positive five-volt potential on line 335 is removed, permitting five volts DC from the power supply to activate the buzzer 340. The second input/output port is connected via line 336 to an infrared photodetector device 374, for use in programming the 64-byte EEPROM memory of the microcontroller 300 with the aisle, rack and position number of the particular carrier 12a, as will be discussed below. The third input/output port is connected via line 338 with the base of a switching transistor 342 which is connected between ground and an infrared photodiode 344, infrared photodiode 344 being connected between the collector of transistor 342 and a plus-five volt power source 346. The infrared photodiode 344 is used during the procedure for programming the EEPROM of microcontroller 300 with respect to rack and aisle number by emitting an infrared signal indicative of the EEPROM programming, as will be discussed below.

A lamp driver circuit 348 is connected through input/output lines 350, 352, and 354 for respectively receiving shift data, data clock, and latch strobe outputs, utilized for illuminating respective ones of LED lights 32a, 32b, and 32c, which are associated with respective ones of the receptacles 44 of the carriage 12a. Each of the lamps 32 may be lit, by driving circuit 348, in a red, green or amber mode, in the manner disclosed in U.S. Pat. No. 5,134,387, which is hereby incorporated by reference. The lamp driver circuit 348 suitably is formed of a series of five UCN-5821A chips, manufactured by Allegro Semiconductor, which are connected in cascade fashion, the output of the first chip being connected through lead 356 to the next chip, not shown, in the series. The first driver chip 348, as shown in the drawing, has four pairs 360a, 360b, 360c, and 360d of output leads for driving the four bicolor LEDs 32a, 32b, 32c, and 32d in red or green, for providing an appropriate indication to an operator. As will be discussed below, a green output is indicative that a requested tape cartridge is in the particular tape cartridge receptacle adjacent the particular LED. A red output is indicative that an error condition exists in the receptacle. For example, a red lamp may indicate that a tape cartridge has been removed, or is not making proper contact, without or apart from an appropriate command input. A combination of green and red output commands produces an amber light, the amber color being indicative that the tape cartridge is not in the receptacle, or is not making proper contact with the respective probe. Exemplary dual segment diode 32d is connected to chip 348 by lines 360d, 368, and to lines 370,372, illustrating in greater detail the LED connections.

As will be discussed in greater detail, the EEPROM memory of microcontroller 300 is operable to store information regarding the location (e.g., aisle number, rack number, and side of aisle) of the respective tape cartridge carrier. Such location information may be entered in the microcontroller's EEPROM memory by any suitable means, and it is advantageously entered by means of an infrared transmitter (to be described with respect to FIG. 15) operable to transmit encoded signals to IR-sensitive photodetector receiver 374, which is suitably an IS435 unit manufactured by the Sharp Company. Photodetector circuit 374, connected to the microcontroller 300 by line 336, is operable to receive sequentially emitted, encoded data segments for programming the EEPROM of the microcontroller 300 with the carrier location.

Referring now to the flowchart of FIGS. 14A and 14B, the operation of the control circuit 42 of FIG. 13 will now be described. An initialization, or "reset" signal is generated by the microcontroller 300 (FIG. 13) when power is first applied to the circuit through the respective power/data module 64a (FIG. 6) associated with the circuit 42. The program stored in the ROM memory of the microcontroller 300 then initiates a check procedure, as indicated at block 376, in which the infrared receiver 374 (FIG. 13) is checked (action block 376) to determine whether an EEPROM programming instruction is being received via the photodetector 374, via line 336 (FIG. 13). Photodetector 374 is thus used to program the 64 byte EEPROM incorporated in the microcontroller chip, in which the aisle, rack, and position of the particular tape carrier is retained in memory.

Assuming that such "carrier location" programming has already been accomplished, no input signal will be received on line 336 (FIG. 13), and, at decision block 380 (FIG. 14A), a negative output will start the tape checking and polling procedure, as indicated by action block 382. Blocks 382 through 396 represent an initial check procedure to see that no new tape cartridges have been inserted in any of the receptacles, and that no cartridges have been removed, without a corresponding tape mount request. Block 382 indicates to block 384 to start tape mount request. Block 382 indicates to block 384 to start the initial inquiry at the first port, and the tape cartridge request, i.e., the volser number of a requested tape cartridge, received from the host computer through the communication network 166 (FIG. 6), is compared with the data base of volser numbers presently stored in the RAM memory of microcontroller 300. At block 384, the tape cartridge volser for the first receptacle or port is read in and compared with the RAM database. At decision block 386, the system determines whether a change has been made in the RAM data base. At this point, the system checks for any changes in the array of tape cartridges within the carrier, that is, the existence of any new tape cartridges, any missing tape cartridges, or any switches of tape cartridges between receptacles. If the answer is yes, the RAM data base is updated at action block 388, and, at steps 390, 392, and 394, the particular type of change is identified. At step 390, the system determines whether the RAM memory has been changed to indicate that a new tape cartridge was inserted in one of the receptacles. If yes, at action block 392, a signal is transmitted to buzzer 340 (FIG. 13), energizing the buzzer with a short "beep".

Similarly, LED driver 348 is activated to illuminate the LED for that particular receptacle. For example, LED 32a may be flashed green for its adjacent receptacle. The next decision, as indicated at step 400, is with respect to whether the old tape cartridge was removed from the receptacle, and if the answer is yes, at block 396, the system compares the tape cartridge number (still stored in the microcontroller's RAM memory) of the removed tape cartridge with the requested volser number, to determine whether the removed tape cartridge was requested by the host computer 52 (FIG. 6). If not, a potential error exists and, at block 394, the LED adjacent the particular receptacle is illuminated in a blinking red mode. This warns the operator that a tape cartridge has been withdrawn in error from the adjacent receptacle. The operator at this point determines whether the tape cartridge has become disconnected or was incorrectly removed, or whether the memory of the tape cartridge has failed. Subsequent to this check, a command is sent on path 397 to block 398 instructing the microcontroller 300 to check the next tape cartridge receptacle using the same procedure. At decision block 402, the system determines whether each of the receptacles or ports have been checked, i.e., whether the last receptacle has been checked, and if not, a command is sent on path 399 to block 384 to initiate the checking procedure for the next receptacle. If yes, a positive command is sent to action block 404.

At block 404, the microcontroller is instructed to read the tape cartridge request message, i.e., the input received through line 316 (FIG. 13). In the present system, such tape cartridge request commands suitably comprise a string of encoded ASCII characters, suitably comprising one "start" bit, seven "data" bits, one "parity" bit and one "stop" bit for each character. Assuming that the system operates at 9600 baud, 960 characters per second will be transmitted, since 10 bits of data are required to transmit each character. The "start of message" character thus informs the microcontroller 300 to look for a command message. A message type code is included in the transmission sequence which is a two digit code that identifies the type of message. Various types of messages are used in the system, such as a tape cartridge request command, or an audit command. The message type is followed by the message text, which, in the present embodiment, is the six digit volser number of the requested tape cartridge. Finally, an "end of message" character is transmitted.

Figure 14A:
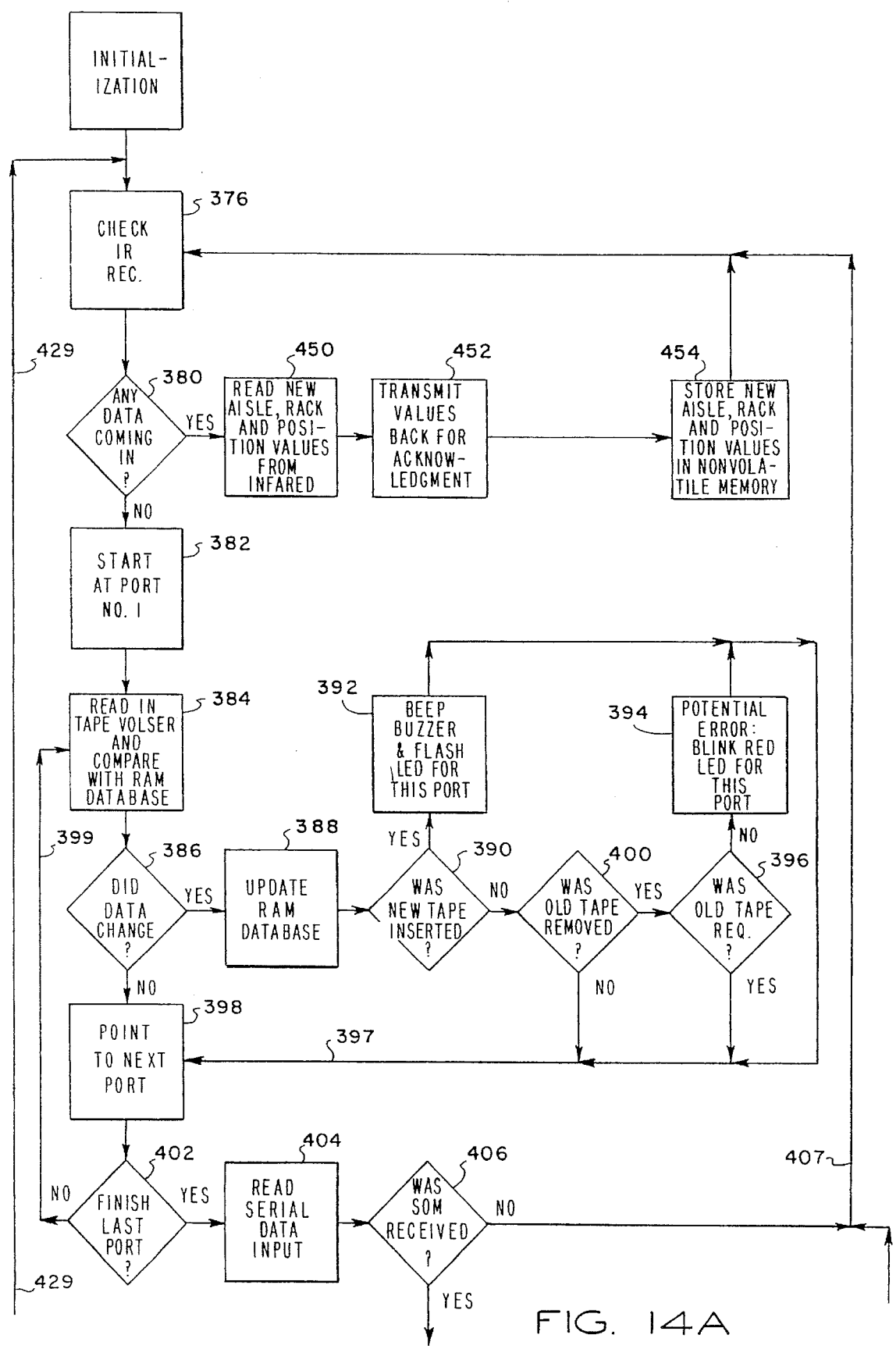
FIGS. 14A and 14B provide a flow chart of the tape carrier polling procedure.
Figure 14B:
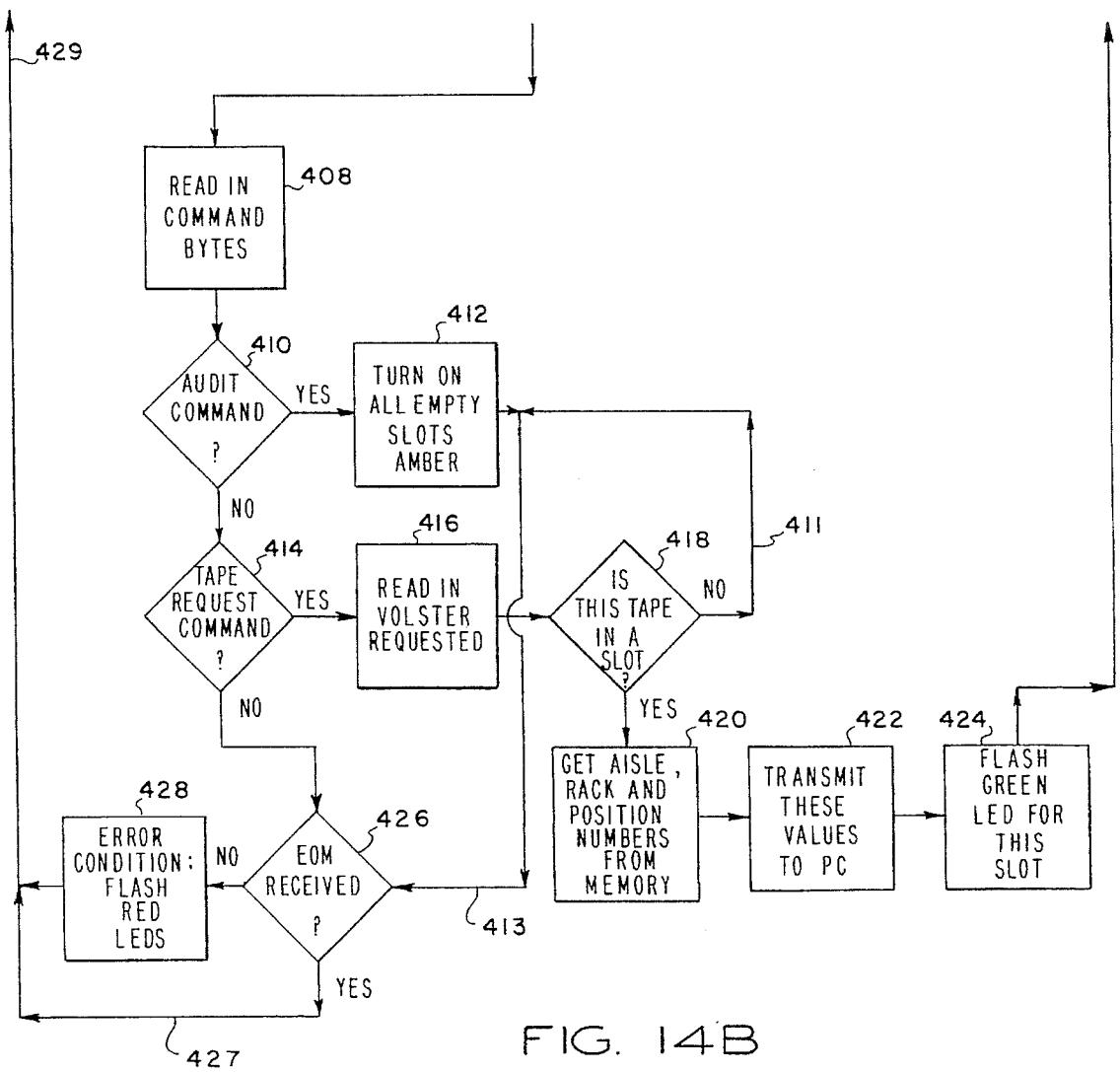

With continued primary reference to FIGS. 14A and 14B, at decision block 406, the system determines whether a start of message code was received. If not, it is assumed that an invalid or spurious message was received, and instruction is sent via path 407 to go through the sequence once more. If, however, the answer, at decision block 406, is yes, the system is instructed at block 408 to read in the command bytes, which correspond to the two digit message type code, which, in the present system, may designate an "audit" command or a "tape cartridge request" command. Assuming that an audit command is received, at step 410, a yes output is sent to block 412, instructing the system to turn on the LEDs corresponding to all empty receptacles, in an amber color. This procedure is thus used if there appears to be trouble in the system, and it permits the operator to go through the tape cartridge library quickly, checking all receptacles indicated with an amber light to determine whether a tape cartridge is not in proper contact with a receptacle probe, or whether a tape cartridge has been removed by mistake, etc. After the LEDS have been illuminated with an amber color, a message is sent on path 413 to inquiry block 426, which queries whether an end-of-message character has been received. If "yes," a message is sent via path 427 and 429 back to decision block 376 to start the cycle again. If "no," a negative command is sent, as indicated by block 428, indicative of an error condition, and all LEDS in the carrier are commanded to flash red. This is indicative that data was sent to the carrier but was interrupted, due to a failure of the host computer 52, the power/data module 64a, or another component, such as a connector, or the like, in the network 166 (FIG. 6).

If the audit command from decision block 410 is negative, the tape request command decision block 414 determines whether a tape request command has been received. If not, at block 426, the microcontroller again determines whether an "end of message" command has been received, as in the above described procedure. If yes, at block 416, the system is commanded to read the requested volser number into the RAM memory of the microcontroller, the volser number corresponding to the message text. Thus, the message text would be the volser number of the requested tape cartridge.

Subsequently, the requested volser number now stored in the RAM memory is compared with the volser numbers of the tape cartridges in each of the receptacles 44 of the carrier by sequentially reading the volser numbers from the respective EEPROM memories associated with the respective tape cartridges stored in the respective receptacles. Sequential checks of the respective EEPROMS are made by sending sequential clock signals to the respective probes 38a, 38b, 38c, et seq., on lines 45b, 332, 334, et seq. (FIG. 13) as discussed above. At decision block 418, the system compares the requested volser number, now stored in RAM, with that of the volser number of each successive tape cartridge, i.e., the volser number stored in the EEPROMs of the respective cartridges within the respective receptacles. If, at decision block 418, the volser number read from a respective receptacle does not match that of the requested volser number, a negative output is sent along path 411 and 413 to initiate a further check, at decision block 426. If the volser numbers do match, a positive instruction is sent to action block 420, instructing the system to get the aisle, rack, and position numbers of the particular receptacle out of the 64 byte EEPROM memory in the microcontroller 300. This "matching tape cartridge location" information is sent back through the network 166 to the host computer 52 (FIG. 6) via output data line 332, gated driver 310, and cable 154 (FIG. 13) as indicated at action block 422 (FIG. 14B), and the LED for the respective receptacle is flashed green by the lamp driver circuit 348 (FIG. 13) as indicated at block 424.

Figure 15:
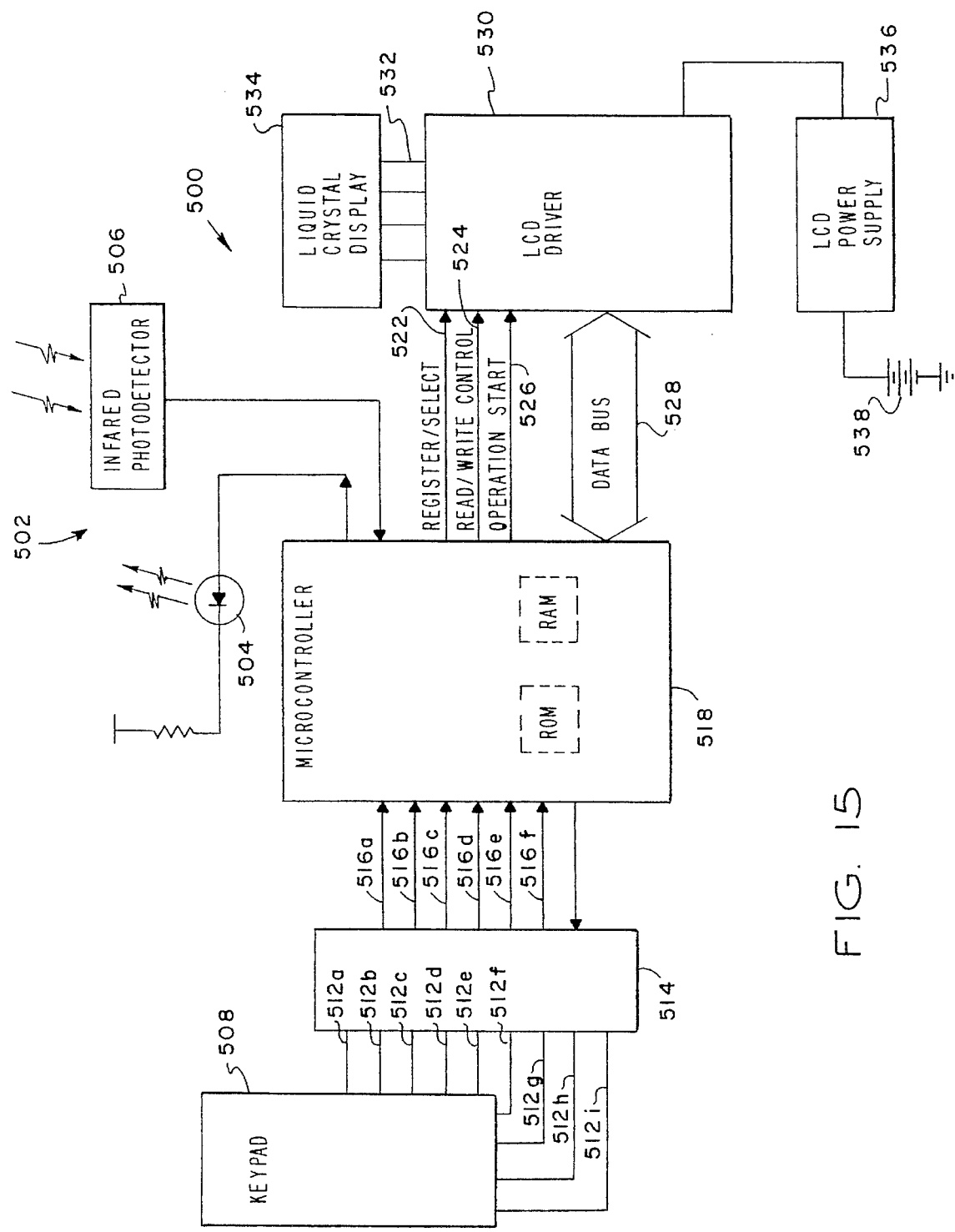
FIG. 15 is a representation in block and pictorial form of the circuit of the tape carrier programming unit.

As discussed above, the respective locations or positions of the tape carriers 12 are stored in the RAM memories of the microcontroller 300 (FIG. 13) of the respective carriers. This position information may be entered by any suitable means. For example, one method is to key in the information by a host computer or other processor (not shown), sequentially connectable through suitable buffer circuitry (not shown) to the respective microcontrollers. The means and method illustrated herein, and now to be described, advantageously utilizes a portable infrared data transmission unit, the output of which is fed into the microprocessor 300 via photodetector circuit 374 (FIG. 13). Blocks 450, 452, and 454 represent a portion of the process for encoding the non-volatile EEPROM memory of the carrier microcontroller 300 by the infrared transmitter, as will now be described. Referring now to FIG. 15, the tape carrier position programmer 500 is used in the programming of carrier position information into the EEPROM memory sections of the microcontroller 300 (FIG. 13) of each respective tape carrier 12, for storing the current location of each tape carrier in its EEPROM memory section, i.e., for storing the aisle, rack, and position of the respective tape carrier. As will now be described, the position programmer 500 is suitably a battery powered, portable unit operable to transmit encoded programming data messages to the respective tape carrier microcontrollers by generating modulated infrared radiation transmissions. As discussed above with respect to FIG. 13, photodetector 374 is provided for sensing an infrared signal, such as that produced by programmer unit 500, and for conducting a corresponding electrical signal, via line 336, to microcontroller 300. Suitably, small windows, not shown, are provided on the front face each of the tape carriers 12, and the photodetector 373 and the infrared diode 344 are mounted adjacent the window for permitting infrared transmission and reception therethrough.

Figure 16:
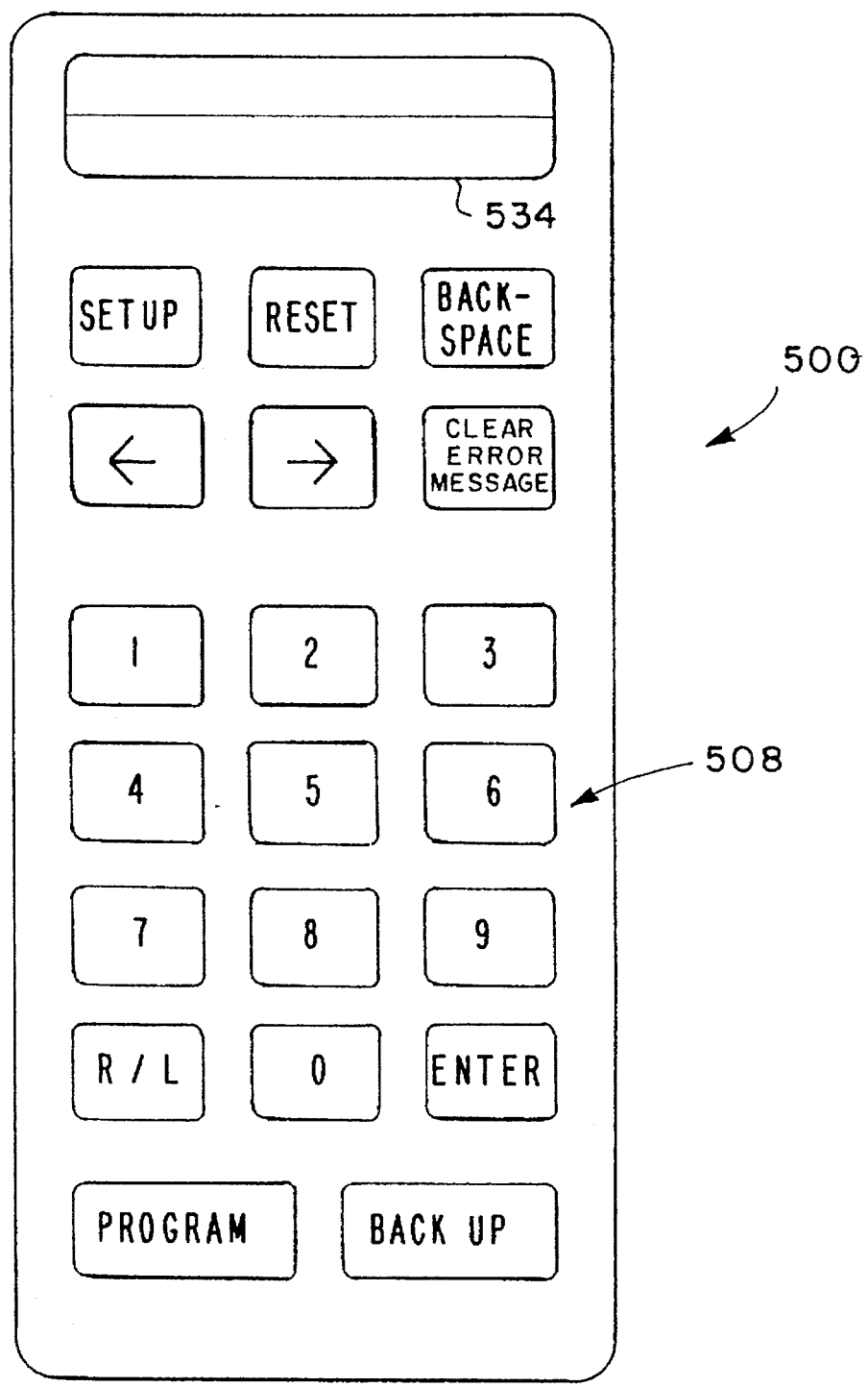
FIG. 16 is a pictorial representation of the tape carrier programming unit showing the keyboard layout.

The carrier position programmer 500 includes a corresponding infrared transceiver 502 (FIG. 15) having an infrared diode 504 and a photodetector 506, the transceiving unit being positioned adjacent the window, with its photodiode 504 positioned in register with the photodetector 374 of the carrier, and its photodetector 506 positioned in register with or adjacent the photodiode 344 of the carrier, for receiving and transmitting encoded messages from the tape carrier position programmer to the tape carrier, via lines 338 and 336, to the microcontroller 300 (FIG. 13) for storing such data in the 64 byte EEPROM within microcontroller 300. Referring additionally to FIG. 16, the location information data is suitably generated by means of a 20-switch keyboard 508. Suitably, the keyboard 508 and the circuitry shown in FIG. 15 is contained in a small handheld unit 500, as shown in FIG. 16, for easy portability. The outputs of keyboard 508 are sent on output lines 512a–512i (FIG. 15) to a decoder unit 514, such as an integrated circuit keyswitch decoder available from National Semiconductor as model MM74C923. The outputs of the decoder 514 are transmitted via lines 516a–516f to an eight-bit microcontroller 518. Microcontroller 518 suitably has two kilobytes of ROM, 256 bytes of RAM and 20 independently controllable input/output pins, and is suitably a Motorola Model No. 68HC05P1P. The microcontroller 518 is connected via register select line 522, read-write-control line 524, operation start line 526, and an eight-bit data bus 528, to an LCD driver circuit 530, such as an HD44780–HD44100H driver, available from Hitachi. LCD driver 530 is connected via LCD driver lines 532 to a 2-line-by-16-character liquid crystal display 534. A suitable power supply 536, including a three-volt battery supply 538, is connected for powering the LCD driver 530. The LCD power supply 536 is operable to convert the three-volt battery supply voltage to plus five and minus five volts DC, as required for the LCD driver 530. Referring to FIG. 16, the LCD display 534 is suitably positioned adjacent and above the keyboard 508.

Figure 17:
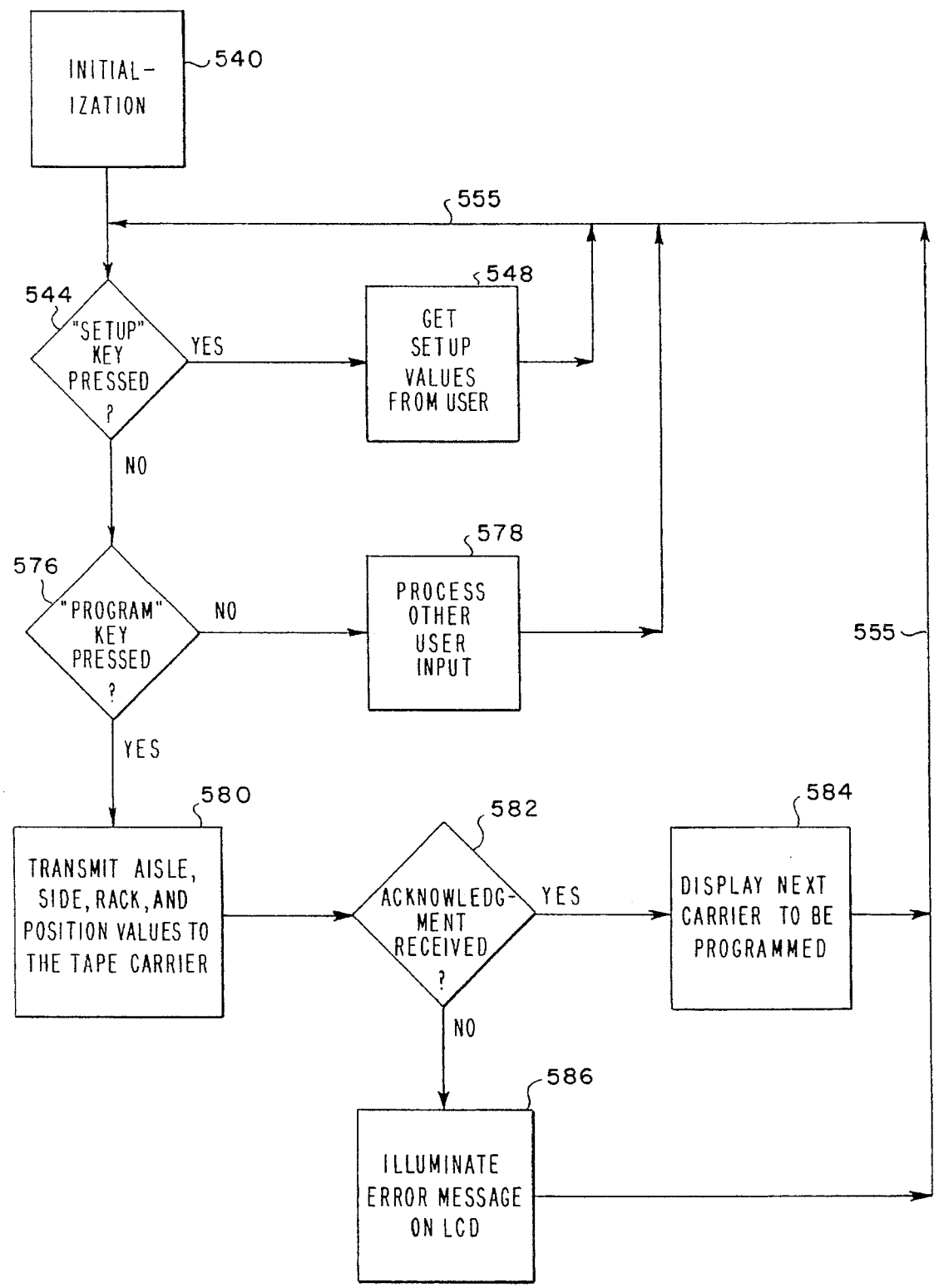
FIG. 17 is a flow chart of the tape carrier programming procedure.

Referring now to FIG. 17, the flowchart will now be used to describe the operation of the carrier position programmer 500. At block 540, the software of the programmer 500 (the programming procedure stored in ROM memory within the microcontroller 518, FIG. 15) is initialized by turning ON a power on/off switch (not shown) in the portable unit. The initial screen display, with respect to the aisle, rack, position, and optionally, aisle side, is zero and "R" ("R" designating the right side of the aisle). At decision block 544, the system queries whether there is user input, in the form of a key pressed by the user, to initiate the "SETUP" command. If yes, at 548, a message is displayed on the LCD display 534 notifying the operator to enter the starting and maximum aisle number of the series to be entered, the aisle side, i.e., left or right, the starting and maximum rack numbers from the user, and the starting and maximum carrier positions. After these setup values are entered, a reset signal is sent back on path 555 to check for further requests. At step 576, the system is queried as to whether the program button has been pressed, and if not, at 578, the system processes any other user input, as required. Such other user inputs may, for example, be the cursor keys, the reset key, the backup key, etc.

At 580, in response to the program initiation at 576, the photodiode 504 (FIG. 15) is activated to transmit a sequential, encoded, infrared signal containing the current aisle, side, rack and position information to the tape cartridge carrier photodetector 374 (FIG. 13). At step 582, the system checks whether an acknowledgement signal has been received, i.e., whether the programmer photodetector 506 has received a corresponding encoded infrared signal from infrared photodiode 344 (FIG. 13) of the carrier, in response to signals produced by the microcontroller 300 within the carrier. If an acknowledgement is received at block 584, the microcontroller 518 is activated to provide a driver signal, via lines 522, 524, 526, and bus 528, commanding LCD driver 530 to activate the liquid crystal display 534 with a visual message indicating the next carrier to be programmed. If the system does not receive acknowledgement, at block 586 an error signal is generated, the error signal being shown as a blinking message on the LCD display 534. Once the user clears the error message by pressing the "clear error message" key, the system is reset for programming the next carrier.

It will now be understood that the coded article monitoring and storage system and method of the present invention provides an apparatus and method for storing and monitoring coded articles in which large numbers of articles may be stored in random order, and in which the location of a requested article may be quickly and reliably determined. The system obviates many of the difficulties and limitations experienced in existing library systems. For example, no central data base of the coded articles is required, thereby avoiding the difficulties and problems involved in the maintenance and updating of such central data bases. Additionally, no operator action is required to update the system when coded articles are removed or transferred from one receptacle to another.

Among the advantages provided by the data transmission network and method of the system is the fact that cables are not required to be connected directly between the host computer and the respective carriers and power/data modules, and further, the fact that return lines from thousands of successive carriers and chains of carriers are merged by successive power/data modules into a single return cable and fed through the communication converter back to the host computer. Finally, the system is of practicable design utilizing standard, readily obtainable components, and is conveniently assembled and programmed.

While only one embodiment of the invention, together with modifications thereof, has been described in detail herein and shown in the accompanying drawing, it will be evident that various further modifications are possible in the arrangement and construction of its components without departing from the scope of the invention.

What is claimed is:

1. An apparatus for monitoring a plurality of coded articles and for determining the location of a selected article, the apparatus comprising:

a plurality of carriers each having a plurality of receptacles each adapted to receive any of a plurality of the coded articles, including articles inserted in random order;

a plurality of memory means, each associated with one of the coded articles, for storing the code of the respective, associated article, each carrier having associated memory processing means for repetitively and sequentially reading the memories associated with any coded articles stored in respective receptacles of the carrier and for storing the codes read from the respective memory means, each carrier having article polling circuitry connected between the associated memory processing means and each receptacle and connectable to the memory means of each coded article received in one of the receptacles;

circuit means, coupled to the memory processing means of the carriers, for determining whether the article code of a selected coded article has been previously stored in one of the memory processing means and, if so, for identifying the location of the selected coded article; and means associated with the circuit means for indicating the location of the selected coded article.

2. The apparatus of claim 1, further comprising means for updating the memory associated with a respective coded article by storing in the memory the usage history of the coded article.

3. The apparatus of claim 1, wherein the memory means of the coded articles each comprise respective means for permanently storing the codes of the respective associated articles and for temporarily storing the usage histories of the respective coded articles.

4. The apparatus of claim 1, wherein the memory processing means of each carrier comprises means for sequentially polling the memories associated with any coded articles received in respective receptacles of the carrier, and storing information read from the memories, the circuit means comprising means for receiving a request for a selected coded article and determining whether the article code of one of the coded articles stored in one of the memory processing means of one of the carriers corresponds with the article code of the selected article.

5. The apparatus of claim 4, wherein the indicating means comprises means associated with the memory processing means for providing a visual display associated with a receptacle in which a selected, coded article is received.

6. The apparatus of claim 1, wherein the circuit means includes a computer and means for conducting electrical signals between the computer and the memory processing means of the respective carriers.

7. The apparatus of claim 6, the circuit means comprising means for transmitting an inquiry message, generated by the computer, to each memory processing means and for determining whether the code of the selected coded article is stored in one of the memory processing means.

8. The apparatus of claim 6, the circuit means comprising means for conducting messages from the carriers to the computer for providing the location of the receptacle in which a selected coded article is received.

9. The apparatus of claim 8, wherein the means for indicating the location of the selected article comprises a display means, associated with the computer, for displaying the location of a selected coded article.

10. An apparatus for storing a plurality of coded articles and for identifying the location of a selected coded article, the apparatus comprising:

a plurality of carriers, each having a plurality of receptacles each adapted to receive one of the coded articles, each coded article having an associated memory, comprising means for storing the code of the respective coded article;

a plurality of processing means, respectively associated with the carriers, for repetitively and sequentially reading the memories of coded articles stored within the carrier receptacles, each processing means having a respective carrier memory, which comprises means for storing the codes and receptacle identities of each coded article received within any of the receptacles of the respective carrier, each carrier having circuitry connected between the carrier processing means and each receptacle and connectable with the memories of each coded article received in one of the carrier receptacles;

computer means for generating an inquiry containing the code of a selected, coded article; and circuit means for transmitting the inquiry from the computer means to each of the processing means, each processing means further comprising means for determining whether the code of the selected coded article matches one of the codes previously stored in the respective, associated carrier memory during the repetitive and sequential reading of the coded article memories and for providing a return message indicating the location of any matching coded article stored in a receptacle of the respective carrier, the circuit means further comprising means for transmitting the return message to the computer means.

11. The apparatus of claim 10, wherein each of the coded article memories comprises a non-volatile memory.

12. The apparatus of claim 11, wherein each of the coded article memories comprises an EEPROM memory device, and wherein the memory processing means comprises means for conducting power to the memory devices when repetitively and sequentially reading the respective memory devices, for activating the memory devices.

13. The apparatus of claim 11, each coded article further having a plurality of contact pads associated with its non-volatile memory, each carrier receptacle having probe means for engaging the contact pads of an inserted coded article and for providing electrical connection, via the contact pads and the carrier circuitry, between the non-volatile memory of the coded article and the processing means of the respective carrier.

14. The apparatus of claim 10, wherein each of the carrier memories is a non-volatile memory means for storing the codes as well as the receptacle locations of coded articles stored within any of the carrier receptacles.

15. The apparatus of claim 10, wherein the circuit means comprises a plurality of circuit modules, each module being associated with at least one carrier in a chain of carriers associated with the module and comprising means, connected to receive inquiries derived from the computer means, for transmitting corresponding inquiries to the processing means associated with one of the carriers in the chain of carriers associated with the respective circuit module.

16. The apparatus of claim 15, wherein each circuit module includes a respective input gating means for converting signals received in differential voltage format into a plurality of digital format signals within the respective module, each circuit module having a plurality of output gating means operable for converting the digital format signals into a plurality of differential voltage output signals and for relaying the differential voltage output signals to respective carriers associated with the respective circuit module.

17. The apparatus of claim 16, each circuit module comprising means for transmitting a plurality of polling inquiries on a plurality of output cables connected between respective ones of the output gating means and respective chains of carriers associated with the respective circuit module.

18. The apparatus of claim 15, each circuit module comprising means operable for receiving a return message from one of the carrier processing means and for causing a corresponding message to be transmitted to the computer means.

19. The apparatus of claim 18, the means operable for receiving a return message including a unidirectional channel merging means for passing any return message to the computer means.

20. The apparatus of claim 19, wherein each unidirectional channel merging means comprises a multi-input OR gate, each input thereof being connected to a respective cable connected to one of the carriers associated with the respective circuit module.

21. The apparatus of claim 20, wherein each cable is connected to the processing means of the first carrier of a chain of carriers associated with the respective circuit module.

22. The apparatus of claim 10, further comprising display means, associated with the computer means, for identifying a carrier which has been determined by a carrier processing means to contain a selected coded article.

23. The apparatus of claim 10, further comprising light emitting means associated with the carriers for visually designating the location of the receptacle in which a selected coded article is received.

24. The apparatus of claim 23, wherein the light emitting means comprise a plurality of light emitting devices each associated with a respective one of the receptacles.

25. The apparatus of claim 24, wherein the light emitting devices comprise respective means for emitting light selected from at least two colors, the apparatus further comprising means for causing a light emitting device associated with a receptacle receiving a selected coded article to emit light of a first color.

26. The apparatus of claim 25, the apparatus further comprising means for causing at least one of the light emitting devices to emit light of a second color for indicating an error condition with respect to an associated receptacle.

27. The apparatus of claim 10, further comprising carrier programming means for encoding carrier position information in the carrier memories associated with the respective carriers.

28. An apparatus for storing a plurality of coded articles and for identifying the location of a selected coded article, the apparatus comprising:

a plurality of carriers, each having a plurality of receptacles each adapted to receive one of the coded articles, each coded article having an associated memory, comprising means for storing the code of the respective coded article;

a plurality of processing means, respectively associated with the carriers, for reading the memories of coded articles stored within the carrier receptacles, each processing means having a respective carrier memory, which comprises means for storing the codes and receptacle identities of each coded article received within any of the receptacles of the respective carrier;

computer means for generating an inquiry containing the code of a selected, coded article; and circuit means for transmitting the inquiry from the computer means to each of the processing means, each processing means further comprising means for determining whether the code of the selected coded article matches one of the codes stored in the respective, associated carrier memory and for providing a return message indicating the location of any matching coded article stored in a receptacle of the respective carrier, the circuit means further comprising means for transmitting the return message to the computer means;

wherein the circuit means comprises a plurality of circuit modules, each module being associated with at least one carrier and comprising means, connected to receive inquiries derived from the computer means, for transmitting corresponding inquiries to the processing means associated with the at least one carrier associated with the respective circuit module, and wherein the computer means comprises means for generating inquiries in a digital format, the circuit means further comprising converter means, connected between the computer means and the plurality of circuit modules, for translating digital inquiries received from the computer means into differential voltage signals for transmission to the circuit modules, and for translating return signals, received in differential voltage format, into digital format for retransmission to the computer means.

29. An apparatus for storing a plurality of coded articles and for identifying the location of a selected coded article, the apparatus comprising:

a plurality of carriers, each having a plurality of receptacles each adapted to receive one of the coded articles, each coded article having an associated memory, comprising means for storing the code of the respective coded article;

a plurality of processing means, respectively associated with the carriers, for reading the memories of coded articles stored within the carrier receptacles, each processing means having a respective carrier memory, which comprises means for storing the codes, and receptacle identities of each coded article received within any of the receptacles of the respective carrier;

computer means for generating an inquiry containing the code of a selected coded article;

circuit means for transmitting the inquiry from the computer means to each of the processing means, each processing means further comprising means for determining whether the code of the selected coded article matches one of the codes stored in the respective, associated carrier memory and for providing a return message indicating the location of any matching coded article stored in a receptacle of the respective carrier, the circuit means further comprising means for transmitting the return message to the computer means;

said circuit means comprising a plurality of circuit modules, each module being associated with at least one carrier and comprising means connected to receive inquiries derived from the computer means for transmitting corresponding inquiries to the processing means associated with the at least one carrier associated with the respective circuit module; and wherein the circuit modules are serially interconnected, and further comprising means for relaying differential voltage output signals to associated circuit modules in the series of circuit modules.

30. An apparatus for storing a plurality of coded articles and for identifying the location of a selected coded article, the apparatus comprising:

a plurality of carriers, each having a plurality of receptacles each adapted to receive one of the coded articles, each coded article having an associated memory, comprising means for storing the code of the respective coded article;

a plurality of processing means, respectively associated with the carriers, for repetitively and sequentially reading the memories of coded articles stored within the carrier receptacles, each processing means having a respective carrier memory, which comprises means for storing the codes and receptacle identities of each coded article received within any of the receptacles of the respective carrier;

computer means for generating an inquiry containing the code of a selected, coded article; and circuit means for transmitting the inquiry from the computer means to each of the processing means, each processing means further comprising means for determining whether the code of the selected coded article matches one of the codes previously stored in the respective, associated carrier memory during the repetitive and sequential reading of the coded article memories and for providing a return message indicating the location of any matching coded article stored in a receptacle of the respective carrier, the circuit means further comprising means for transmitting the return message to the computer means wherein each of the coded article memories comprises a non-volatile memory, further comprising encoding means for storing the respective code of each coded article in the memory associated with the respective coded article.

31. The apparatus of claim 30, wherein the encoding means comprises:

a receptacle for receiving a coded article and having probe means for conducting encoding signals to the non-volatile memory associated with the coded article;

encoding circuit means, connected to the probe means, for generating a sequence of encoding signals for programming the non-volatile memory of a coded article received in the encoding means receptacle; and control means, associated with the encoding circuit means, for applying a series of signals to the encoding circuit means corresponding to the characters of the code assigned to said coded article, the encoding circuit means comprising means for applying a sequence of digital encoding signals corresponding with the signals applied by the control means.

32. The apparatus of claim 31, wherein the encoding circuit means includes a processor means for generating the sequential encoding signals for encoding the non-volatile memory of the coded article received in the encoding means receptacle, and for subsequently reading the non-volatile memory of said coded article and determining whether the assigned code has been encoded.

33. The apparatus of claim 32, the coded article being provided with a bar code label containing the code assigned to the respective coded article, further comprising a bar code reader, associated with the computing means, for reading the bar code and entering the assigned code into the computing means.

34. The apparatus of claim 32, wherein the coded articles are magnetic tapes, further comprising tape drive means for receiving one of the tapes and reading its assigned code from a portion of the magnetic tape, and entering it into the computing means.

35. The apparatus of claim 34, further comprising means for automatically and sequentially loading magnetic tapes into the tape drive means, and wherein the probe is adapted to contact the non-volatile memory of a magnetic tape loaded into the tape drive for transmitting encoding signals to the encoding circuit means for effective programming of said non-volatile memory while the associated magnetic tape is loaded in the tape drive means.

36. An apparatus for storing a plurality of coded articles and for identifying the location of a selected coded article, the apparatus comprising:

a plurality of carriers, each having a plurality of receptacles each adapted to receive one of the coded articles, each coded article having an associated memory, comprising means for storing the code of the respective coded article;

a plurality of processing means, respectively associated with the carriers, for reading the memories of coded articles stored within the carrier receptacles, each processing means having a respective carrier memory, which comprises means for storing the codes and receptacle identities of each coded article received within any of the receptacles of the respective carrier;

computer means for generating an inquiry containing the code of a selected, coded article; and circuit means for transmitting the inquiry from the computer means to each of the processing means, each processing means further comprising means for determining whether the code of the selected coded article matches one of the codes stored in the respective, associated carrier memory and for providing a return message indicating the location of any matching coded article stored in a receptacle of the respective carrier, the circuit means further comprising means for transmitting the return message to the computer means, wherein each of the coded article memories comprises a non-volatile memory;

further comprising encoding means for storing the respective code of each coded article in the memory associated with the respective coded article;

wherein the encoding means comprises:

a receptacle for receiving a coded article and having probe means for conducting encoding signals to the non-volatile memory associated with the coded article;

encoding circuit means, connected to the probe means, for generating a sequence of encoding signals for programming the non-volatile memory of a coded article received in the encoding means receptacle; and control means, associated with the encoding circuit means, for applying a series of signals to the encoding circuit means corresponding to the characters of the code assigned to said coded article, the encoding circuit means comprising means for applying a sequence of digital encoding signals corresponding with the signals applied by the control means; and wherein the control means comprises means for generating encoding signals in TTL format.

37. The apparatus of claim 36, wherein the control means comprises means for generating signals in RS232 format.

38. The apparatus of claim 37, wherein the control means comprises a computing means.

39. The apparatus of claim 38, further comprising a keyboard for entering the assigned code into the computing means.

40. An apparatus for storing a plurality of coded articles and for identifying the location of a selected coded article, the apparatus comprising:

a plurality of carriers, each having a plurality of receptacles each adapted to receive one of the coded articles, each coded article having an associated memory, comprising means for storing the code of the respective coded article;.

a plurality of processing means, respectively associated with the carriers, for reading the memories of coded articles stored within the carrier receptacles, each processing means having a respective carrier memory, which comprises means for storing the codes and receptacle identities of each coded article received within any of the receptacles of the respective carrier;

computer means for generating an inquiry containing the code of a selected, coded article; and circuit means for transmitting the inquiry from the computer means to each of the processing means, each processing means further comprising means for determining whether the code of the selected coded article matches one of the codes stored in the respective, associated carrier memory and for providing a return message indicating the location of any matching coded article stored in a receptacle of the respective carrier, the circuit means further comprising means for transmitting the return message to the computer means, further comprising carrier programming means for encoding carrier position information in the carrier memories associated with the respective carriers, wherein the carrier programming means comprises circuitry means for generating encoded position information and means for transmitting the encoded position information to a respective carrier.

41. The apparatus of claim 40, further comprising means associated with each carrier for receiving encoded carrier position information from the carrier programming means and for applying a sequence of corresponding encoding signals to the respective carrier memory for storing in said carrier memory the current location of the respective carrier.

42. The apparatus of claim 40, wherein the circuitry means for generating encoded carrier position information comprises a portable, battery powered unit and wherein the means for transmitting the encoded position information comprises a transceiving means for transmitting the encoded position information to an adjacent carrier, the carriers having corresponding transceivers for receiving said position information.

43. The apparatus of claim 42, wherein the transceivers are infrared transceivers.

44. A method for monitoring a plurality of coded articles and for identifying the location of a selected coded article, comprising the steps of:

providing a plurality of carriers, each having a plurality of receptacles adapted to receive one of the coded articles, the carriers having respective memories, and the coded articles having respective memories associated therewith;

storing in the coded article memories the article codes of the respective, associated coded articles;

inserting coded articles in at least some of the carrier receptacles;

repetitively and sequentially polling the memories of coded articles received in the carrier receptacles and repetitively storing the codes and locations of said coded articles in the respective carrier memory means;

polling the carrier memories, in response to a request for a selected coded article, for determining whether a code previously stored in one of the carrier memories during the step of repetitively and sequentially polling the memories of the coded articles matches the code of the selected coded article; and providing an indication of the current location of a selected coded article.

45. The method of claim 44, further comprising the step of visually displaying the location of a selected, coded article.

46. The method of claim 45, wherein the step of visually displaying the location of a selected coded article comprises displaying the location of the carrier in which the selected coded article is stored.

47. A method for monitoring a plurality of coded articles and for identifying the location of a selected coded article, comprising the steps of:

providing a plurality of carriers, each having a plurality of receptacles adapted to receive one of the coded articles, the carriers having respective memories, and the coded articles having respective memories associated therewith;

storing in the coded article memories the article codes of the respective, associated coded articles;

inserting coded articles in at least some of the carrier receptacles;

polling the memories of coded articles received in the carrier receptacles and storing the codes and locations of said coded articles in the respective carrier memory means;

polling the carrier memories, in response to a request for a selected coded article, for determining whether a code stored in one of the carrier memories matches the code of the selected coded article; and providing an indication of the current location of a selected coded article, wherein the carrier memories comprise respective non-volatile memory devices each associated with a respective one of the carriers, further comprising the step of:

programming the non-volatile carrier memory devices by encoding therein the current locations of the respective, associated carriers.

48. The method of claim 47, wherein the step of programming the non-volatile carrier memory devices comprises:

providing a battery-powered, portable programming means having transceiver means for generating programming signals corresponding to the location of a respective carrier and a transceiver means associated with each carrier for receiving the programming signals received from the programming means;

locating the portable programming means adjacent said carrier; and causing the transceiver means of the programming means to transmit a programming signal to the transceiver means of the respective carrier.

* * * * *